United States Patent
McClory et al.

(10) Patent No.: US 10,514,967 B2
(45) Date of Patent: Dec. 24, 2019

(54) SYSTEM AND METHOD FOR RAPID AND ASYNCHRONOUS MULTITENANT TELEMETRY COLLECTION AND STORAGE

(71) Applicant: Datapipe, Inc., Jersey City, NJ (US)

(72) Inventors: Thomas Patrick McClory, Carlsbad, CA (US); Jatil Chandrakant Damania, Jersey City, NJ (US); Scott Matthew Vidmar, Graham, WA (US); Ross Edward Lonstein, West Hurley, NY (US)

(73) Assignee: Datapipe, Inc., Jersey City, NJ (US)

( * ) Notice: Subject to any disclaimer, the term of this patent is extended or adjusted under 35 U.S.C. 154(b) by 0 days.

(21) Appl. No.: 15/655,128

(22) Filed: Jul. 20, 2017

(65) Prior Publication Data

US 2018/0322437 A1 Nov. 8, 2018

Related U.S. Application Data

(60) Provisional application No. 62/503,079, filed on May 8, 2017.

(51) Int. Cl.
*G06F 9/54* (2006.01)
*G06F 9/50* (2006.01)
(Continued)

(52) U.S. Cl.
CPC ............ *G06F 9/546* (2013.01); *G06F 8/30* (2013.01); *G06F 8/41* (2013.01); *G06F 8/60* (2013.01);
(Continued)

(58) Field of Classification Search
CPC .... G06F 8/71; G06F 11/3684; G06F 11/3688; G06F 9/45558; G06F 9/5027;
(Continued)

(56) References Cited

U.S. PATENT DOCUMENTS 9,485,303 B2 * 11/2016 Lee ..................... H04L 67/10
10,013,239 B2 7/2018 Zhang et al.
(Continued)

OTHER PUBLICATIONS

Non-Final Office Action directed to U.S. Appl. No. 15/695,988, dated Dec. 13, 2018, 31 pages.
(Continued)

*Primary Examiner* — Charles E Anya
(74) *Attorney, Agent, or Firm* — Sterne, Kessler, Goldstein & Fox P.L.L.C.

(57) ABSTRACT

Disclosed herein are system, apparatus, article of manufacture, method, and/or computer program product embodiments for rapid, asynchronous multitenant telemetry collection and storage of multiple tenants. An embodiment operates by receiving a telemetry storage request from a telemetry application configured to collect telemetry information from a deployed application and queuing the received telemetry storage request into a gatekeeper command queue. The embodiment further operates by retrieving the received telemetry storage request from the gatekeeper command queue and publishing a decorated telemetry collection event to a global event stream by transmitting the decorated telemetry collection event to an event stream component configured to manage the global event stream.

17 Claims, 7 Drawing Sheets

(51) Int. Cl.

| | |
|---|---|
| *H04L 29/06* | (2006.01) |
| *G06F 8/30* | (2018.01) |
| *G06F 8/41* | (2018.01) |
| *G06F 8/60* | (2018.01) |
| *G06F 8/71* | (2018.01) |
| *G06F 11/36* | (2006.01) |
| *G06F 9/455* | (2018.01) |
| *G06Q 10/06* | (2012.01) |
| *H04L 12/24* | (2006.01) |
| *H04L 29/08* | (2006.01) |
| *G06F 8/77* | (2018.01) |

(52) U.S. Cl.
CPC ............ *G06F 8/71* (2013.01); *G06F 9/45558* (2013.01); *G06F 9/505* (2013.01); *G06F 9/5027* (2013.01); *G06F 11/3684* (2013.01); *G06F 11/3688* (2013.01); *G06Q 10/06398* (2013.01); *H04L 41/5041* (2013.01); *H04L 41/5054* (2013.01); *H04L 63/0236* (2013.01); *H04L 63/0281* (2013.01); *G06F 8/77* (2013.01); *G06F 2009/45583* (2013.01); *G06F 2009/45587* (2013.01); *G06F 2009/45591* (2013.01); *G06F 2209/501* (2013.01); *G06F 2209/541* (2013.01); *G06F 2209/548* (2013.01); *H04L 41/5083* (2013.01); *H04L 63/1433* (2013.01); *H04L 67/10* (2013.01)

(58) Field of Classification Search
CPC . G06F 9/546; G06F 9/505; G06F 8/77; G06F 2009/45583; G06F 2009/45591; G06F 2209/541; G06F 2209/548; G06F 2209/501; G06Q 10/06398; H04L 67/10
See application file for complete search history.

(56) References Cited

U.S. PATENT DOCUMENTS

| | | | |
|---|---|---|---|
| 2002/0133504 A1 | 9/2002 | Vlahos et al. | |
| 2010/0241722 A1* | 9/2010 | Seminaro | H04L 67/025 |
| | | | 709/207 |
| 2013/0007183 A1 | 1/2013 | Sorenson, III et al. | |
| 2014/0130056 A1 | 5/2014 | Goodman | |
| 2014/0280658 A1 | 9/2014 | Boling et al. | |
| 2014/0282421 A1 | 9/2014 | Jubran et al. | |
| 2014/0344672 A1 | 11/2014 | Kapoor | |
| 2014/0351686 A1 | 11/2014 | Yawn | |
| 2015/0172148 A1* | 6/2015 | Ishida | H04L 43/045 |
| | | | 709/224 |
| 2015/0186132 A1 | 7/2015 | Oliveri et al. | |
| 2016/0019300 A1* | 1/2016 | Dove | G06F 17/30115 |
| | | | 707/731 |
| 2016/0092179 A1 | 3/2016 | Straub | |
| 2016/0092297 A1 | 3/2016 | Mazon et al. | |
| 2016/0127254 A1 | 5/2016 | Kumar et al. | |
| 2016/0357660 A1 | 12/2016 | Dean et al. | |
| 2017/0004185 A1* | 1/2017 | Zhu | G06F 11/00 |
| 2017/0131974 A1 | 5/2017 | Balasubramanian et al. | |
| 2017/0180289 A1 | 6/2017 | Chiappone et al. | |
| 2017/0195386 A1* | 7/2017 | Nathan | H04L 65/4084 |
| 2018/0027051 A1 | 1/2018 | Parees et al. | |
| 2018/0074973 A1 | 3/2018 | Chan et al. | |
| 2018/0089328 A1* | 3/2018 | Bath | G06F 17/30946 |
| 2018/0181376 A1 | 6/2018 | Balasubramanian et al. | |
| 2018/0262592 A1* | 9/2018 | Zandi | H04L 67/34 |
| 2018/0321918 A1 | 11/2018 | McClory et al. | |
| 2018/0321979 A1 | 11/2018 | Bahramshahry et al. | |
| 2018/0321993 A1 | 11/2018 | McClory et al. | |
| 2018/0324204 A1 | 11/2018 | McClory et al. | |

OTHER PUBLICATIONS

Non-Final Office Action directed to U.S. Appl. No. 15/617,428, dated Sep. 17, 2018, 13 pages.
Final Office Action directed to U.S. Appl. No. 15/617,428, dated Jun. 13, 2019, 23 pages.
Tsai, Wei-Tek, Yu Huang, and Qihong Shao. "EasySaaS: A SaaS development framework." Service-oriented computing and applications (SOCA), 2011 IEEE International Conference on SOCA. IEEE, 2011.

* cited by examiner

SYSTEM AND METHOD FOR RAPID AND ASYNCHRONOUS MULTITENANT TELEMETRY COLLECTION AND STORAGE

CROSS REFERENCE TO RELATED APPLICATION

This application claims the benefit of priority to U.S. Provisional Application No. 62/503,079, filed on May 8, 2017, which is herein incorporated by reference in its entirety.

BACKGROUND

Field

This disclosure is generally directed to collection and storage of telemetry information. More particularly, this disclosure relates to rapid and asynchronous multitenant telemetry collection and storage with respect to applications and associated hardware/software components.

Background

The transition of the traditional physical infrastructure to a service-oriented architecture has allowed application developers to focus more on the development of their applications rather than maintaining their own physical infrastructure. However, to meet demands from internal and external customers (e.g., high availability, incremental improvements, etc.), the ability to rapidly troubleshoot, fix, iterate, and update deployed applications have become a necessity. In order to meet demands from internal and external customers, new solutions and mechanisms are required to enable application developers and/or cloud services providers to monitor various telemetry information associated with their applications.

SUMMARY

Provided herein are system, apparatus, article of manufacture, method and/or computer program product embodiments, and/or combinations and sub-combinations thereof, for rapid asynchronous telemetry collection and storage.

According to an embodiment, a telemetry storage request may be received by a gatekeeper command component from a telemetry application configured to collect telemetry information from a deployed application, the telemetry storage request including telemetry information and associated telemetry tag information (or telemetry tags information). In an embodiment, the gatekeeper command component may queue the received telemetry storage request into a gatekeeper command queue, where the gatekeeper command queue may be configured to store the received telemetry storage request. In an embodiment, a gatekeeper worker component may retrieve the received telemetry storage request from the gatekeeper command queue, and publish a decorated telemetry collection event to a global event stream by transmitting the decorated telemetry collection event to an event stream component configured to manage the global event stream.

Further embodiments, features, and advantages of the disclosure, as well as the structure and operation of the various embodiments, are described in detail below with reference to accompanying drawings.

BRIEF DESCRIPTION OF THE FIGURES

The accompanying drawings are incorporated herein and form a part of the specification.

Figure 1:
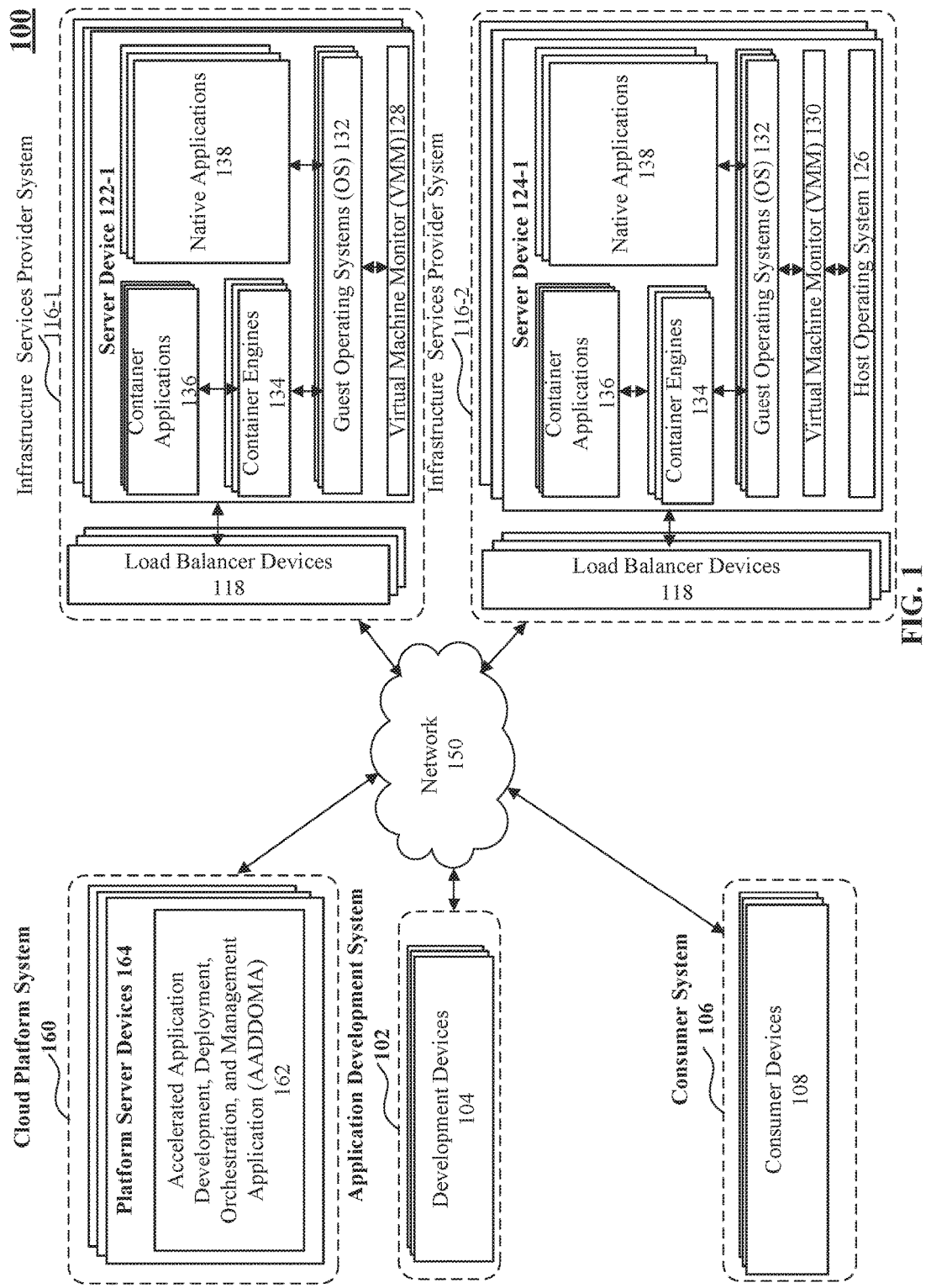
FIG. 1 illustrates a block diagram of Accelerated Application Development, Deployment, Orchestration, and Management System (AADDOMS) in an example embodiment.

Like reference numerals refer to corresponding parts throughout the several views of the drawings. Additionally, generally, the left-most digit(s) of a reference number identifies the drawing in which the reference number first appears. Furthermore, one or more designators to the right of a reference number such as, for example, "m" and "n" and other similar designators are intended to be variables representing any positive integer. Thus, for example, if an implementation sets a value for n=4, then a complete set of elements 116-$n$ may include elements 116-1, 116-2, 116-3, and 116-4. Furthermore, unless explicitly stated otherwise, a complete set of elements may vary for a given feature, embodiment, and/or implementation even though the same designator may be used between various features, embodiments, and/or implementations.

DETAILED DESCRIPTION

With the availability of IaaS providers, application developers are no longer required to setup, maintain, and update their own physical infrastructure (e.g., server devices, network devices, storage devices, etc.) that host their applications and provide services to their customers. While such a transition of the traditional physical infrastructure to a microservices-based or cloud-native architecture allowed application developers to focus more on the development of their applications rather than maintaining their own physical infrastructure, new solutions and mechanisms are required to enable organizations and their application developers to architect, design, build, test, and deploy their applications to the various IaaS providers. Furthermore, the initial deployment of an application is typically only the beginning of the application's life cycle. In order to meet demands from internal and external customers (e.g., high availability, incremental improvements, etc.), the ability to rapidly troubleshoot, fix, iterate, and update deployed applications have become a necessity.

While existing solutions enable the application developers to accomplish some of these functionalities (e.g., deployment of their applications, testing of their applications, etc.), many of these functionalities are fragmented in various different solutions. Furthermore, extensive knowledge, configuration, and modifications of these different solutions are also typically required in order to create, develop, test, and deploy an application to an infrastructure services provider. This is often implemented with little consistency, and there is a lack of a dedicated management method. And even with such configurations and modifications, the existing solutions do not enable an application developer to: (1) quickly create an application with a customizable development pipeline that incorporate the best development practices, (2) rapidly build, test, and deploy their application on a continuous basis to their desired infrastructure services providers; (3) monitor, access, and receive alerts regarding performance of their deployed applications, and (4) provide authentication, authorization, access control, and/or accounting with respect to their deployed applications in an integrated solution. Existing solutions also do not provide the application developers (or application developers of the AADDOMA) with an integrated solution of monitoring their deployed applications and scaling that solution to multitenant capable system.

FIG. 1 illustrates a block diagram of the AADDOMS 100 that provides an integrated solution that enables application developers to achieve these and other functionalities according to an example embodiment. In particular, the AADDOMS 100 may include a cloud platform system 160, application development system 102, consumer system 106, and infrastructure services provider systems 116, where each of these systems may be operatively and communicatively coupled via network 150.

In various embodiments, the network 150 may be representative of one or more computer and/or telecommunications networks that may enable coupled and/or interconnected systems and/or devices to communicate information between and among each other. In various embodiments, the network 150 may include, without limitation, intranet, extranet, Internet, and/or any other local, regional, global telecommunications network.

In various embodiments, the network 150 may include various wireless network devices configured to encode and/or decode information and receive and/or transmit the encoded information as radio signals in frequencies consistent with the one or more wireless communications standards (e.g., Wireless IEEE 802.11, WiMAX IEEE 802.16, Global Systems for Mobile Communications (GSM), Enhanced Data Rates for GSM Evolution (EDGE), Long Term Evolution (LTE), Bluetooth standards, Near Field Communications (NFC) standards, etc.). Additionally or alternatively, the network 150 may also include various wired network devices configured to receive and/or transmit the encoded information as electrical and/or optical signals consistent with one or more wired and/or optical network standards (e.g., Ethernet, Fibre Channel, etc.).

In an embodiment, the cloud platform system 160 may be representative of a system generally arranged to provide application developers with accelerated development, deployment, orchestration, and management of their container applications 136 and/or native applications 138. For example, the cloud platform system 160 may provide application developers with the functionality to rapidly design, create, build, test, and/or deploy their container applications 136 and/or native applications 138 to the respective infrastructure services provider systems 116. The services of the deployed container applications 136 and/or native applications 138 may then be accessed or used by the application developer's customers, clients, or consumers via their systems (e.g., consumer system 106).

In an embodiment, the one or more container applications 136 and/or native applications 138 may also implement a microservice architecture, where the structures of an application may be implemented as a set of individual microservices that are separated and organized by their discrete functions. In an embodiment, the individual microservices may be implemented with a variety of programming languages (e.g., Java, JavaScript, C#, C++, Python, PHP, Ruby, Go, Perl, and Erlang, Node.js, Elixir, etc.) and may be communicatively and/or operatively coupled to each other via distributed messaging systems (e.g., APACHE Kafka, PIVOTAL RabbitMQ, etc.) and overlay networks (e.g., flannel, WEAVE Net, Project Calico, etc.) to collectively provide the functionalities of the application. The individual microservices may also be independently built, tested, and deployed to facilitate continuous integration (CI) and continuous delivery (CD) software development and information technology operations (DevOps) paradigm(s).

In an embodiment, the cloud platform system 160 may also provide application developers with the functionality to continuously update, build, test, and deploy their container applications 136 and/or native applications 138 including one or more individual microservices to the respective infrastructure services provider systems 116. Additionally or alternatively, the cloud platform system 160 may further provide telemetry information (e.g., metrics, logs, etc.) to the application developers and enable application developers to manage authentication, authorization, and access control of their container applications 136 and/or native applications 138.

To enable these and other functionalities, the cloud platform system 160 may include one or more platform server devices 164 generally arranged to host an AADDOMA 162. In an embodiment, the AADDOMA 162 may be configured to provide these functionalities to the application developers via one or more command line interfaces (CLIs) and/or graphical user interfaces (GUIs), which may include, without limitation, web-based GUIs, client-side GUIs, or any other GUI that provide these functionalities to an application developer. In addition to CLIs and GUIs, the AADDOMA 162 may be further configured to provide one or more programmatic interfaces (e.g., Application Programming Interfaces (APIs), etc.) accessible by the application developers via customized applications, CLIs, and/or GUIs. In an embodiment, the APIs may be designed in accordance with one or more programming paradigms (e.g., Design-by-Contract (DbC), etc.).

In an embodiment, the application development system 102 may be representative of an example system of individuals, corporations, organizations or other entities for the development of applications hosted by the infrastructure services provider systems 116. The application development system 102 may include, without limitation, one or more development devices 104 (e.g., development devices 104-1, 104-2, 104-3, etc.) used by application developers to develop various applications including, for example, their associated microservices (if any).

For example, the one or more development devices 104 may be representative of workstations used by application developers to create one or more container applications 136 and/or native applications 138. Continuing with the example, the one or more development devices 104 may also include, without limitation, various software development applications such as, for example, one or more source code editors, compilers, linkers, debuggers, source code analyzers, source code management systems, asset repositories, and/or Integrated Development Environments (IDE).

In an embodiment, the one or more development devices 104 may further include one or more CLI and/or GUI based applications configured to communicate and utilize the various functionalities provided by the AADDOMA 162 via network 150. For example, the one or more development devices 104 may be configured to determine application creation configuration information based on one or more answers to questions provided by application developers via a CLI and/or GUI based application (e.g., application orchestration client application 214 further discussed in FIG. 2). Continuing with the previous example, the CLI based application may be operatively and communicatively coupled to the one or more programmatic interfaces of the AADDOMA 162 and transmit the application creation configuration information to the AADDOMA 162. The AADDOMA 162 may receive application creation configuration information from the one or development devices 104. And in response, the AADDOMA 162 may create, build, test, and deploy one or more container applications 136 and/or native applications 138 to a designated infrastructure services provider system such as infrastructure services provider system 116-1. In an embodiment, the application creation configuration information may be determined using just a few pieces of data, which can be obtained from the application developer by asking simple questions, such as software architecture information of the application and the development stack information associated with the application. Once deployed, the container applications 136 and/or native applications 138 may execute on the infrastructure services provider system 116-1 and provide services to the consumer system 106.

It may be appreciated that by using the AADDOMA 162, application developers may continuously deploy their applications with certainty and consistency validated by built in, frequent, recurring, automated, and configurable testing. By using the AADDOMA 162, extensive knowledge and modifications of existing solutions are no longer necessary to create and deploy applications to infrastructure services providers. Moreover, the AADDOMA 162 may provide application developers with a base infrastructure that is scalable and responsive, and available when needed. The AADDOMA 162 may also allow application developers to assess the performance of their applications and provide proactive triggers. The AADDOMA 162 may further ensure that the application developers have controlled access and that their applications are protected. These are merely a few of the benefits of the AADDOMA 162, as further benefits and advantages will be further discussed.

In an embodiment, the consumer system 106 may be representative of typical consumer devices used by clients, consumers, developers, and/or other end users of a deployed application. In particular, the consumer system 106 may include one or more consumer devices 108 (e.g., consumer devices 108-1, 108-2, 108-3, etc.) that may be operatively and/or communicatively coupled to the container applications 136 and/or native applications 138 to provide its end users with various services via network 150. For example, the one or more consumer devices 108 may be representative of Internet of Things (IoT) devices (e.g., Internet capable appliances, Internet capable thermostats, etc.), mobile devices (e.g., mobile phones, tablets, laptop computers, etc.), embedded devices (e.g., 3D printers, home security devices, vehicle navigation devices, etc.), computing devices (e.g., workstations, desktop computers, etc.) or any other electronic devices that rely on the services provided by the one or more container applications 136 and/or native applications 138.

In an embodiment, the infrastructure services provider systems 116 may be representative of various data centers of cloud computing services providers (e.g., MICROSOFT Azure, AMAZON Web Services, GOOGLE Compute Engine, ALIBABA Cloud, etc.), each implementing a variety of protocols (e.g., Hyper Text Transfer Protocol (HTTP), HTTP Secure (HTTPS), etc.), standard formats (e.g., JavaScript Object Notation (JSON), Extensible markup Language (XML), etc.), and/or APIs (e.g., MICROSOFT Services Management APIs, AMAZON Elastic Compute Cloud APIs, GOOGLE Cloud JSON APIs, etc.). Additionally or alternatively, in some embodiments, the infrastructure services provider systems 116 may be representative of data centers internal or external (e.g., DATAPIPE data centers, etc.) to an application developer's organization configured to provide cloud computing services.

In some embodiments, the infrastructure services provider systems 116 may be geographically separated (e.g., separate physical locations, etc.) and virtually separated (e.g., separate network domains, etc.). In other embodiments, the infrastructure services provider systems 116 may be substantially geographically co-located (e.g., in substantially the same physical location, etc.) and virtually connected (e.g., in the same network domain, etc.). Alternatively, in some embodiments, the infrastructure services provider systems 116 may be geographically separated yet virtually connected or substantially geographically co-located yet virtually separated.

In an embodiment, the infrastructure services provider systems 116 may optionally include one or more load balancer devices 118 operatively and communicatively coupled to the respective server devices 122 and 124. The load balancer devices 118 and server devices 122 (or server devices 124) may also be operatively and/or communicatively coupled to each other via one or more internal networks (not shown) to facilitate communications between the server devices 122 (or server devices 124) and the load balancer devices 118.

To achieve a high degree of availability and responsiveness, and prevent any system, application, and/or component from becoming a single point of failure, the load balancer devices 118 may be generally configured to route or distribute incoming network traffic among multiple server devices 122, guest operating systems 132, and/or container applications 136 and/or native applications 138. The routing and distribution of incoming requests may be determined based on network and transport layer protocols (e.g., port number, IP address, etc.) and/or application layer data (e.g., HTTP header, Uniform Resource Identifier (URI), etc.). Additionally or alternatively, the routing and distribution of incoming requests may be further determined based on the availability, computational load, and/or network load of the server devices. Additionally or alternatively, the routing and distribution of incoming requests may also be determined based on responsiveness of the one or more applications 136 and 138.

For example, the load balancer devices 118 may be configured to route and distribute an incoming HTTP request received from a consumer device (e.g., consumer device 108-1, 108-2, 108-3, etc.) via network 150 to an appropriate server device (e.g., server device 122-1) that hosts a container application or a native application configured to process and/or respond to the incoming HTTP/HTTPS request. The appropriate server device may be determined by the load balancer devices 118 based on the HTTP header of the HTTP request and associated Uniform Resource Identifier. Additionally, the appropriate server device may be further determined by the load balancer devices 118 based on the availability, computational load, and/or network load of the server devices that hosts the container applications 136 and/or the native applications 138 configured to process and/or respond to the incoming HTTP request.

It may be appreciated that while load balancer devices 118 are illustrated as separate devices in FIG. 1, at least a portion of the functionality of the load balancer devices 118 may be performed by a load balancer application (not shown). For example, instead of the one or more load balancer devices 118 performing the functionalities discussed above, a load balancer application (e.g., AMAZON Elastic Load Balancer, GOOGLE Cloud Load Balancer, etc.), which may be implemented as one or more container applications 136 and/or native applications 138 deployed and executed by the one or more server devices 122 and/or 124. In some embodiments, the load balancer application may be configured to implement some or even all the functionalities of the load balancer devices 118. Thus, in some embodiments, the load balancer application may be configured to receive incoming network traffic and route or distribute incoming network traffic among multiple server devices 122, guest operating systems 132, and/or container applications 136 and/or native applications 138.

In an embodiment, each of the server devices (e.g., server device 122-1) of an infrastructure services provider system 116-1 may generally include, without limitation, a virtual machine monitor (VMM) (e.g., VMM 128), which may be configured to execute directly on the server devices and manage the concurrent execution of one or more guest operating systems 132. For example, VMM 128 may be representative of a native or bare-metal hypervisor (e.g., VMWARE ESXi hypervisor, MICROSOFT Hyper-V hypervisor, KVM hypervisor, Proxmox hypervisor, etc.) configured to execute and manage multiple instances of guest operating systems 132 (e.g., MICROSOFT Windows Server, Ubuntu Server, Debian Linux, CentOS Linux, Red Hat Linux, Ubuntu Snappy, CoreOS, VMWARE Photon, etc.) on the server device 122-1.

In an embodiment, the server devices (e.g., server device 124-1) of infrastructure services provider system 116-2 may generally include, without limitation, a host operating system (e.g., host operating system 126-1), which may be further configured to execute a VMM (e.g., VMM 130). The VMM 130 may be a non-native hypervisor which may be configured to execute on a host operating system and manage the concurrent execution of one or more guest operating systems 132. For example, the host operating system 126 may be representative of a server based operating system (Ubuntu Server, MICROSOFT Windows Server, etc.) and the VMM 130 may be representative of a non-native hypervisor (e.g., VMWARE Work Station, VirtualBox, CANONICAL LXD Container Hypervisor, etc.) configured to execute on the host operating system 126 and manage multiple instances of guest operating systems 132 (e.g., Windows Server, Ubuntu Server, Debian Linux, CentOS Linux, Red Hat Linux, Ubuntu Snappy, CoreOS Container Linux, VMware Photon, etc.) on the server device 124-1.

In an embodiment, the one or more guest operating systems 132 may be generally configured to execute one or more container engines 134 (e.g., Docker Container Engine, rkt Container Engine, etc.) and one or more native applications 138. In an embodiment, each of the one or more container engines 134 may be configured to host and manage the execution of one or more container applications 136 within one or more container instances, where each container instance (not shown) may execute a container application in its own isolated runtime environment. In an embodiment, each container instance may include, without limitation, a container operating system (OS), one or more container applications, and associated container components (e.g., executable binaries, support libraries, etc.) to support the execution of the one or more container applications. In an embodiment, each container instance may be created and hosted by the container engine 134 based on a container application image, which may include, without limitation, the container OS image, the container application(s), and associated container components. Thus, the container applications 136 may be hosted and managed by the one or more container engines 134 and defined by its associated container application images. In an embodiment, each container engine of the one or more container engines 134 may also be configured to host and manage the execution of one or more container applications created and deployed by the AADDOMA 162.

In embodiments where the one or more container applications 136 are implemented using a microservices architecture, each container instance may be generally configured to host a microservice of a container application and its associated dependencies. In these embodiments, each container instance may also be configured to host its associated microservice in an isolated runtime environment, where each microservice may be operatively and communicatively coupled to each other to collectively provide services of a particular container application.

In an embodiment, the native applications 138 may include one or more applications that share a common execution environment with a container engine and other native applications 138 in a guest operating system. In an embodiment, the native applications 138 may also include one or more support applications that manage the deployment and execution of the one or more container applications 136 in a container engine of a guest operating system. In an embodiment, the native applications 138 may also include one or more native applications created and/or deployed by the AADDOMA 162.

In an embodiment, container applications 136 and/or native applications 138 may interact with one or more existing services separate from the application during execution. Each service may publish an endpoint accessible by the application, for example in the form of an API. To create and deploy an application as discussed above, the application creation configuration information used by AADDOMA 162 may include API configuration information for each service that contains information required to connect to and invoke the service.

Figure 2:
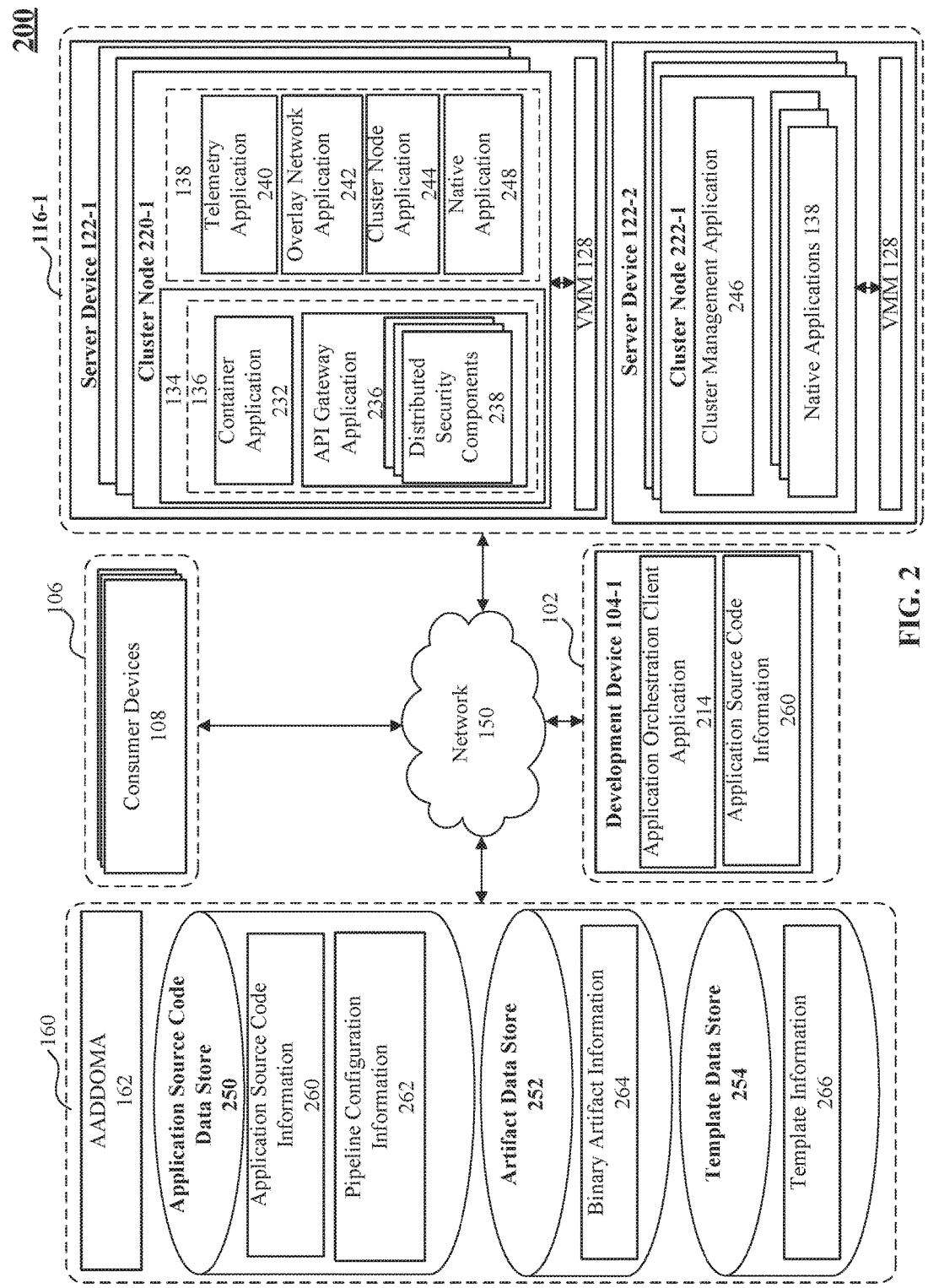
FIG. 2 illustrates another block diagram of the AADDOMS in an example embodiment.

FIG. 2 illustrates another block diagram of the AADDOMA 162 configured to create, build, test, and deploy one or more applications in an example embodiment 200. For example, to create an application with a customizable development, testing, and deployment pipeline, the development device 104-1 may include an application orchestration client application 214 and application source code information 260 may generally include source code for the application and application build configuration for the application.

In an embodiment, the application orchestration client application 214 may be configured to authenticate the application developer based on user authentication information (e.g., login name and password, access token, etc.) provided by the application developer. Once authenticated, the application orchestration client application 214 may employ the AADDOMA 162 to retrieve available developer information representative of common configuration preferences and defaults associated with the application developer identified by their authentication information. Alternatively, the application orchestration client application 214 may be representative of a terminal emulator (e.g., PuTTY, etc.), a Secure Shell client (e.g., OpenSSH, etc.), or a web browser (e.g., GOOGLE Chrome, etc.) configured to connect to AAD- DOMA 162 via one or more secure protocols (e.g., Secure Shell (SSH) protocol, Hyper Text Transfer Protocol Secure (HTTPS), etc.).

In an embodiment, based on the available developer information retrieved by AADDOMA 162, the application orchestration client application 214 may be configured to present the application developer with one or more questions via a CLI and/or a GUI. In an embodiment, the questions may elicit responses for at least a portion of the application creation configuration information. In an embodiment, the remaining portion of the application creation configuration information may be automatically generated either based on the responses, based on available developer information, or a combination of both. In an embodiment, the application creation configuration information may generally include information that the AADDOMA 162 may use to create, build, test, and deploy an application to an infrastructure services provider system (e.g., infrastructure services provider system 116-1). Additionally, the questions presented to the application developer may be appropriately ordered and may omit any available developer information previously queried.

In an embodiment, the appropriate order of questions to present to an application developer for the creation of an application may include the following order: (1) a name, version, and/or description associated with the application, (2) a location of a data store for storing and/or accessing the application's source code and associated application source code access information (e.g., an API access token, login name and password, etc.) for accessing the data store, (3) one or more programming language(s) associated with the application (e.g., Java, JavaScript, C#, C++, Python, PHP, Ruby, Go, Perl, and Erlang, Node.js, Elixir, etc.) (4) one or more data store(s) associated with the application (e.g., MySQL, MongoDB, InfluxDB, etc.), (5) one or more application source code generation automation options, (6) one or more application build configuration options, and (7) one or more application deployment locations.

In an embodiment, the application creation configuration information may include, without limitation, the location of an application source code data store configured to store application source code information, application source code access information for accessing private application source code data stores, a deployment location of the application, a name of the application, a brief description of the application, creator's name for the application, the creator's credentials (e.g., creator's email address, creator's full name, creator's phone number, creator's organization title, etc.) associated with the application, version information for the application, an organization associated with the application, the software architecture information of the application, the development stack information associated with the application, at least one application template name that identifies a code template used to generate the initial source code for the application, or any combination of thereof.

In an embodiment, the location of the application code data store may identify either a public or a private application code data store in a source code hosting facility (e.g., Github, Gitlab, etc.). Additionally, in embodiments with private application source code data stores, AADDOMA 162 may be configured to access the private application source code data store with application developer provided application source code access information (e.g., an API access token, login name and password, etc.). Alternatively, in embodiments where the application developer did not identify a location of an application source code data store for the application, the AADDOMA 162 may be configured to create a private application source code data store 250 for the application within the cloud platform system 160.

In an embodiment, the development stack information associated with the application may generally identify the operating system, the runtime environment, the dependences, and/or the programming language used and relied upon by the application to be created by the AADDOMA 162. For example, the development stack may identify a Linux operating system, with an Apache web server, a MySQL database, and JavaScript with node.js as the runtime environment.

In an embodiment, the application source code data store 250 may be generally configured to store the source code for an application (i.e., application source code information 260). In an embodiment, the application source code data store 250 may be further configured to store one or more workflows configured to continuously integrate, test, and/or deploy the application, which may be represented as pipeline configuration information 262.

In an embodiment, the pipeline configuration information 262 may include, without limitation, integration workflow information that defines an integration workflow and testing workflow information that defines a testing workflow. In an embodiment, the pipeline configuration information may also define the one or more workflows in a domain-specific language (DSL) in order to provide application developers with maximum flexibility and simplicity when customizing the integration and testing workflows. In an embodiment, the pipeline configuration information 262 may further include, without limitation, infrastructure creation information that defines an infrastructure creation workflow and deployment configuration information that defines a deployment workflow.

In an embodiment, the cloud platform system 160 may further include an artifact data store 252 (e.g., SONATYPE Nexus, JFROG Artifactory, etc.) configured to store binary artifacts represented as binary artifact information 264. In an embodiment, the binary artifacts information may be generated and stored in the artifact data store 252, when the application is built based on the pipeline configuration information 262. In an embodiment, the binary artifact information may include, without limitation, a native application package and/or container application image of the built application.

In an embodiment and based at least partially on the available developer information and/or application creation configuration information, the AADDOMA 162 may be generally configured to perform the initial creation and deployment of an application. To perform the initial creation and deployment of an application, the AADDOMA 162 may be generally configured to: (1) provision an application source code data store (e.g., application source code data store 250) configured to store application source code information (e.g., application source code information 260); (2) generate application source code information based on an identified application template stored in a template data store (e.g., template information 266 stored in template data store 254); (3) store the generated application source code information (e.g., application source code information 260) in the provisioned application source code data store (e.g., application source code data store 250); (4) validate the location of the artifact data store (e.g., artifact data store 252) configured to store binary artifact information (e.g., binary artifact information 264); (5) create and configure an integration workflow and testing workflow for the application; (6) build the application source code information to create an initial set of binary artifacts for testing and deployment;

(7) store the initial set of binary artifacts for the application in the artifact data store; (8) test the initial set of binary artifacts and generate test results; (9) optionally provision an application infrastructure (e.g., a cluster including cluster node 220-1 and cluster node 222-1, etc.) within the designated infrastructure services provider system (e.g., infrastructure services provider system 116-1); and/or (10) deploy the application (e.g., custom container application 232, custom native application 248) to an existing or newly created application infrastructure in the designated infrastructure services provider system (infrastructure services provider system 116-1).

In an embodiment, instead of the AADDOMA 162 being configured to generate application source code information as discussed immediately above in (3), the application orchestration client application 214 may be configured to locally generate the application source code information (e.g., application source code information 260 of development device 104-1) based on an identified application template stored in a template data store (e.g., template information 266 stored in template data store 254). Continuing with the above embodiment, after locally generating application source code information, the application orchestration client application 214 may be configured to upload or transmit the generated application source code information (e.g., application source code information 260) to the application source code data store (e.g., application source code data store 250), where the AADDOMA 162 may be configured to: (4) validate the location of the artifact data store; (5) create workflows for the application; (6) build the application source code information; (7) store the initial set of binary artifacts for the application; (8) test the initial set of binary artifacts and generate test results; (9) optionally provision an application infrastructure; and/or (10) deploy the application (e.g., custom container application 232, custom native application 248, etc.) to an existing or newly created application infrastructure as discussed above with respect to AADDOMA 162.

In an embodiment, the AADDOMA 162 may also be configured to roll back or reverse any changes made during the initial application creation process when a failure condition is detected. In an embodiment, a failure condition may include, without limitation, a failure to create an asset during the build and deployment of the application. In an embodiment, the asset may include any resource or package of files generated during the build and deployment of the application, which may include scripts, files, file archives, packages, binaries, container images, test applications, and/or the like. In such embodiments, the AADDOMA 162 may be generally configured to remove the generated build artifacts and roll back or reverse any modifications made during the initial creation and deployment of an application.

In an embodiment, the AADDOMA 162 may also be configured to provide application creation status information to the application developer via the application creation client application 214. In an embodiment, the various components of the AADDOMA 162 may generate events and provide progress information indicating the creation and deployment progress of the one or more stages performed by the AADDOMA 162 to create and deploy an application. The progress information may include, without limitation, the stage information indicating the current stage of the application creation and deployment, the time stamp information associated with the status information, and the status information indicating whether the current status is "in progress," "delayed," "waiting," "complete," "failed," or "unknown." In an embodiment, the progress information may be provided in a CLI or visually presented in a GUI (e.g., a progress bar, etc.) in real-time to the application developers via the application orchestration client application 214.

In an embodiment, after the initial application has been created and deployed to an infrastructure services provider system, the application developer may update the application by making changes to the source code of the application (i.e., the application source code information 260) on their development device 104-1. These changes may then be transmitted and stored in the application source code data store (e.g., application source code data store 250). In order to continuously integrate and test these changes and deploy an updated application that incorporate these tested changes, the AADDOMA 162 may be further configured to automatically: (1) detect changes or updates in the application source code data store (e.g., application source code data store 250) indicating an update to the application source code information; (2) build the application source code information to create a set of binary artifacts representative of at least a portion of the updated application for testing and deployment; (3) test at least a portion of the updated application based on one or more configured tests; (4) store the binary artifacts in the artifact data store; (5) detect changes in the artifact data store or receive an event to start the deployment of at least a portion of the updated application; and/or (6) deploy at least a portion of the updated application.

In an embodiment, AADDOMA 162 during the initial creation and deployment of an application may be configured to provision an application infrastructure to host the deployed application. To provision the application infrastructure, the AADDOMA 162 may be configured to create a cluster that includes two or more cluster nodes such as cluster nodes 220-1 and 222-1 on one or more server devices such as server devices 122-1 and 122-2, respectively. In an embodiment, the created cluster may include at least one master cluster node such as cluster node 222-1 that includes a guest OS (e.g., guest OS 132) configured to execute one or more applications that manage one or more slave cluster nodes. In an embodiment, the created cluster may also include at least one slave cluster node such as cluster node 220-1 that includes a guest OS (e.g., guest OS 132) configured to execute one or more applications that communicate with a master cluster node and manages the execution of one or more container applications (e.g., container applications 136, etc.) and/or native applications (e.g., native applications 138, etc.) of the slave cluster node. It may be appreciated that the number of cluster nodes and the topology of the cluster nodes may vary based on the application creation configuration information determined based on answers to questions from the application developer.

In an embodiment, the created cluster may include at least one cluster node 222-1 as a master cluster node. In this embodiment, the cluster node 222-1 may be generally configured to manage one or more slave cluster nodes such as cluster node 220-1 in a cluster. To achieve these and other functionalities, the guest OS (e.g., guest OS 132) of a master cluster node such as cluster node 222-1 may be generally configured to execute, among other native applications 138, cluster management application 246. In an embodiment, the cluster management application 246 may be generally configured to enable the management of the cluster by the AADDOMA 162 via one or more APIs, monitor the availability and status of one or more slave cluster nodes, manage the scheduling of execution of one or more container applications 136, and/or native applications 138 on the one or more slave cluster nodes, and scale the execution of the one or more applications on the one or more slave cluster nodes.

In an embodiment, the created cluster may also include at least one cluster node 220-1 as a slave cluster node. In this embodiment, the cluster node 220-1 may be generally configured to communicate with a master cluster node such as cluster node 222-1 and manage the execution of one or more container applications 136, and/or native applications 138 of the slave cluster node in a cluster node. To achieve these and other functionalities, the guest OS (e.g., guest OS 132) of a slave cluster node such as cluster node 220-1 may be generally configured to execute, among other native applications, a cluster node application 244 configured to maintain communication with the cluster management application 246 and provide status information to the cluster management application 246. To manage the execution of one or more applications (e.g., container applications 136 and/or native applications 138, etc.) on the cluster node 220-1, the cluster node application 244 may be configured to initiate, monitor, and maintain the execution of one or more applications (e.g., container applications 136 and/or native applications 138, etc.) in accordance with management and scheduling as determined by the cluster management application 246 of the master cluster node, i.e., cluster node 222-1.

In an embodiment and during the initial creation of a cluster for an application, the AADDOMA 162 may be generally configured to deploy a telemetry application 240, an overlay network application 242, and a cluster node application 244 to the one or more cluster nodes (e.g., slave cluster nodes). In an embodiment, the telemetry application 240 may be generally configured to monitor health of the one or more container applications 136, native applications 138 and/or associated infrastructure by collecting metrics (e.g., application CPU usage, application memory usage, application network utilization, request queue depth, request response time, etc.) and logs (e.g., error logs, API access logs, etc.) associated with and/or generated by the one or more container applications 136 and/or native applications 138. In an embodiment, the overlay network application 242 may be generally configured to provide an overlay network (e.g., flannel, Weave Net, etc.) to facilitate secure communications between and among one or more applications (e.g., custom container application 232, custom native application 248, container applications 136, and/or native applications 138, etc.) in a cluster.

In an embodiment and during the initial creation of a cluster for an application, the AADDOMA 162 may be generally configured to deploy the newly created container application 232 and optionally, an API gateway application 236 to a slave cluster node (e.g., cluster node 220-1). In an embodiment, the optional API gateway application 236 may be generally configured to provide one or more public and/or private APIs that may be handled by the newly created container application 232. In an embodiment, the optional API gateway application 236 may also include distributed security components 238 that may be configured to provide authentication, authorization, access control, and/or accounting services to the one or more APIs managed by the API gateway application 236.

In embodiments where the one or more applications is implemented using a microservices architecture, the individual microservices may be distributed to one or more cluster nodes (e.g., one or more slave cluster nodes such as cluster nodes 220-1 . . . 220-*n*). Additionally, the microservices may utilize the overlay network application 242 and the API gateway application 236** in one or more cluster nodes to collectively provide the services of an application.

Figure 3:
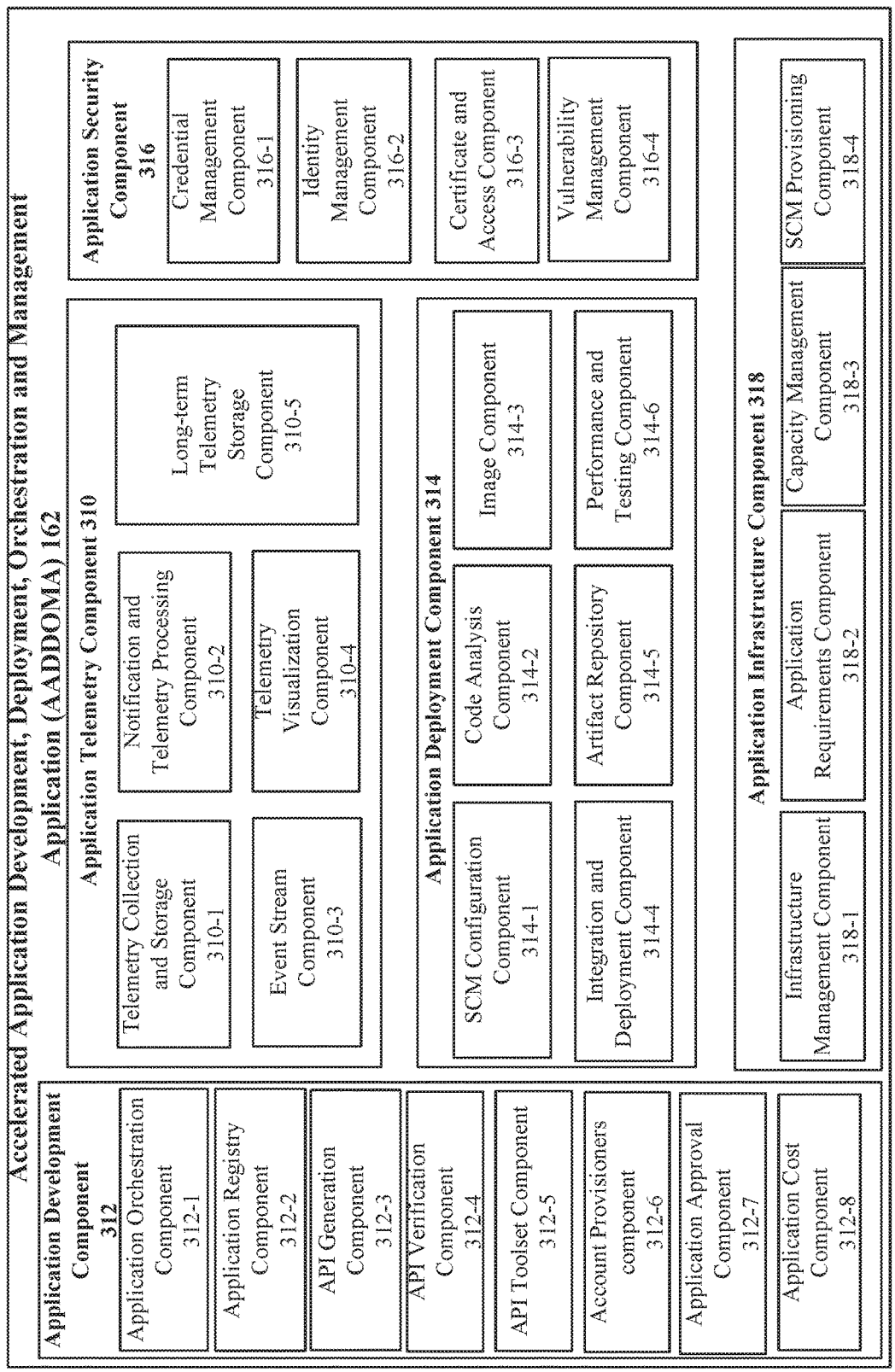
FIG. 3 illustrates a block diagram of the various components of the Accelerated Application Development, Deployment, Orchestration, and Management Application (AADDOMA) according to an example embodiment.

FIG. 3 illustrates a block diagram of the various components of the accelerated application development, deployment, orchestration, and management application according to an example embodiment 300. In FIG. 3, AADDOMA 162 may include, without limitation, application development component 312, application telemetry component 310, application deployment component 314, application security component 316, and application infrastructure component 318.

In an embodiment, the application development component 312 may generally include, without limitation, application orchestration component 312-1, application registry component 312-2, API generation component 312-3, API verification component 312-4, API toolset component 312-5, account provisioners component 312-6, application approval component 312-7, and application cost component 312-8. These components may be operatively and/or communicatively coupled to each other and generally configured to: (1) create, orchestrate, and manage applications and associated components (e.g., data stores, cluster nodes, APIs, etc.) based on application creation configuration information received from application developers; (2) determine application requirements information and application cost information; and/or (3) provide notifications to organizations for applications approval and/or changes prior to deployment of the application.

In an embodiment, the application orchestration component 312-1 may be generally configured to facilitate the creation of a variety of different types of applications (e.g., custom container application 232, custom native application 248, etc.) based on application creation configuration information. In an embodiment, the application orchestration component 312-1 may be generally configured to determine the application creation configuration information by providing one or more questions to an application developer and receiving one or more responses from the application developer via application orchestration client application 214. Once the application creation configuration information is determined, the application orchestration component 312-1 may be further configured to perform the initial creation and deployment of the application as previously discussed with respect to FIG. 2.

In an embodiment, the application orchestration component 312-1 may also be generally configured to generate application requirements information based on the application creation configuration information. The application requirements information may include a set of values that define how the application will be created, built, tested, deployed, and/or managed. In an embodiment, the list of requirements may also be implemented in a domain-specific language (DSL).

In an embodiment, the application orchestration component 312-1 may be further configured to generate application source code information (e.g., application source code information 260) and pipeline configuration information (e.g., pipeline configuration information 262) based on the application creation configuration information. The application source code information may generally include, without limitation, the source code of the application to be created and application build configuration of the application to be created (e.g., makefiles, etc.).

In an embodiment, the pipeline configuration information may also include, without limitation, integration workflow and testing workflow configured to facilitate continuous integration of the application to be created and the frequent, recurring, automated, and configurable testing of the created application. The pipeline configuration information may further include an infrastructure creation workflow configured to facilitate the creation of a new cluster (if needed) and a deployment workflow configured to facilitate deployment of the created and tested application to the newly created cluster or an existing cluster as designated by the application developer.

In an embodiment, the application orchestration component 312-1 may also be generally configured to provide the generated application requirements information to the application requirements component 318-2 to determine the application resource information which may include, without limitation, the number of cluster nodes required for an application, and the number of container instances to be hosted by the cluster nodes for the application. The application orchestration component 312-1 may also be generally configured to provide the application resource information and application creation configuration information to the application cost component 312-8 to determine application cost information. The application cost information may generally include an itemized Total Cost of Ownership (TCO) estimate associated with creating, deploying, and/or managing the application.

In an embodiment, the itemized TCO estimate may include, without limitation, one or more costs associated with: (1) hosting and managing the application developer's application within an infrastructure services provider system, (2) underlying operational activities associated with the hosted application (e.g., network traffic, other resources billed by bandwidth or storage volume, etc.) in the infrastructure services provider system, (3) third party applications and/or components integrated with the application developer's application, (4) additional and optional third party application integrated with the application developer's application, (5) development, testing, and maintenance of the AADDOMA 162, and/or (6) additional levels of technical support in creating, building, testing deploying, and/or managing the application developer's application.

In an embodiment, the application registry component 312-2 may be generally configured to manage and visually present a data store of indices of an application developer's applications and associated components (e.g., data stores, common AADDOMA 162 applications and components, etc.). In an embodiment, the application registry component 312-2 may be updated when an application developer creates a new container application or new native application. In an embodiment, the application registry component 312-2 may be generally configured to store links or references to information for one or more applications and associated components. The information may include, without limitation, location of endpoints of an application and/or associated components for retrieval of telemetry information, mappings for retrieval of configuration information, deployment versions and identifier of the application and/or associated components, endpoints of the application and/or component to facilitate interaction with other applications and/or components.

In an embodiment and with continued reference to the application registry component 312-2, the indexed or referenced applications may be visually presented in one or more views (e.g., one or more GUI views visually presented in a web browser). In an embodiment, the one or more views may include, without limitation, a customizable application developer view and a cloud platform view. In an embodiment, the one or more views may be generally arranged to visually present the different applications, associated components of applications, and relationships between the applications and associated components as one or more graphical elements (e.g., nodes and links, etc.) that may represent application developer's applications, associated applications and components, data stores, network communications, API endpoints, and/or the like.

In an embodiment and with continued reference to the application registry component 312-2, the application developer view may be generally arranged to visually present the applications, associated components of the applications, and their relationships based on, for example, the organizational hierarchy (e.g., business units, design teams, etc.) of an application developer's organization. In an embodiment, the cloud platform view may be generally arranged to present the application developer view with different applications associated components of the applications, and their relationships based on, for example, the dependencies (e.g., data dependency, etc.) between the applications and associated components.

In an embodiment, the application registry component 312-2 may also be generally configured to enable the addition of descriptive information to the graphical elements that represent an application or an associated component of the application in one or more views. In this embodiment, the descriptive information and its associated application or component may be stored in a data store as key-value pairs. In an embodiment, the one or one or more views may also be visually customized and linked.

In an embodiment, the API generation component 312-3 may be generally configured to generate API specifications information and generate one or more APIs exposed by an API gateway for an application developer's application (e.g., custom container application 232, custom native application 248) in accordance with one or more programming paradigms (e.g., DbC, etc.). In an embodiment, the API generation component 312-3 may be configured to provide an API gateway via an API gateway application (not shown), where the API gateway application may be an existing API gateway application managed by the AADDOMA 162 (not shown) or an application developer's own API gateway application (e.g., API gateway application 236) deployed with the application.

In an embodiment, the API gateway may be generally configured to provide distributed rate limiting, authentication, authorization, access control, and/or accounting to manage and/or monitor access of one or more APIs exposed by the API gateway. In an embodiment, the API gateway may be configured to expose and aggregate multiple generated APIs behind a single Domain Name System (DNS) name. In an embodiment, each generated API may also be operatively connected to one or more endpoints of the application developer's created and deployed application.

In an embodiment, the API verification component 312-4 may be generally configured to create automated API test applications based on the API specifications information for one or more APIs exposed by an API gateway. The API test applications may be configured to validate the one or more APIs in accordance with the API specifications information and one or more programming paradigms (e.g., DbC, etc.). For example, the API test applications may validate the one or more APIs based on specific and agreed upon preconditions, post-conditions for each function of an API and validate all functions of the API based on general rules or invariants that govern the API. Additionally or alternatively, the API gateway hosted by an API gateway application itself may be configured to validate the one or more APIs during runtime in accordance with the API specifications information and one or more programming paradigms (e.g., DbC, etc.).

In an embodiment, the API toolset component 312-5 may be configured to provide one or more APIs for common AADDOMA 162 applications and/or components (e.g., event publisher components, event listener components that interface with the event stream component 310-3, etc.) that may be deployed with the application developer's application (e.g., custom container application 232, custom native application 248). The API toolset component 312-5 may be configured to create, manage, and register one or more services within an API gateway hosted by an API gateway application for the one or more common AADDOMA 162 applications and/or components.

In an embodiment, the account provisioners component 312-6 may be generally configured to manage accounts associated with one or more users (e.g., application developers of an organization, DevOps engineers of an organization, managers of an organization, reviewers of an organization, executives of an organization, etc., etc.) of the AADDOMA 162 for one or more organizations. In an embodiment, the account provisioners component 312-6 may be generally configured to create one or more accounts for the one or more users of the AADDOMA 162 and manage user authentication information associated with each user account. In an embodiment, the account provisioners component 312-6 may also be configured to manage common configuration preferences and defaults for the one or more users such as application developers (e.g., developer information) and/or one or more users within a particular organization.

In an embodiment, the application approval component 312-7 may be generally configured to elicit approval from organizations before the creation and/or deployment of an application and provide organizations with the ability to control the cost of creating, deploying, and/or managing applications in the AADDOMS 100. Additionally or alternatively, the application approval component 312-7 may also be generally configured to elicit approvals from an application developer's organization, when the application creation configuration information used to create an application substantially deviates from presets or defaults of an organization's application creation configuration information.

For example, the application approval component 312-7 may be configured to provide an approval notification (e.g., email notification, notification via an user interface (UI) element, etc.) to a designed user (e.g., manager of an organization, etc.) via a development device (e.g., development device 104-2, 104-3, etc.) to elicit an approval to create and/or deploy an application when a minimum number of cluster nodes required to host the application in an infrastructure services provider system substantially increases from the organization's default number of cluster nodes per application (e.g., greater than fifty (50) percent, seventy (70) percent, etc.). In response to receiving the elicited approval from the development device associated with the designated user, the application approval component 312-7 may be configured to enable the creation and/or deployment of the application.

In an embodiment, the application approval component 312-7 may be configured to provide application approval notifications to the application developer's organization: (1) after determining the application creation configuration information and application cost information but before creating an application; (2) after creating the application but before deployment of the application to the infrastructure services providers; and/or (3) after creating the application but before changing the configuration/scale (e.g., increases or decreases from the organization's default number of cluster nodes per application, etc.) of the application. The application approval notifications may include, without limitation, application cost information. The application cost information may include the costs associated with creating, deploying, and/or managing the application. In an embodiment, the application approval component 312-7 may be configured to enable organizations to provide approvals (or disapprovals) prior to creation of an application and/or deployment of an application in response to a particular application approval notification.

In an embodiment, the application cost component 312-8 may be generally configured to provide the application cost information to one or more components of the AADDOMA 162 (e.g., the application orchestration component 312-1) based on at least a portion of application requirements information generated by the application requirements component 318-2 and/or at least a portion of application creation configuration information for a particular application to be created and deployed. As previously discussed, the application cost information may generally include an itemized TCO estimate associated with creating, deploying, and/or managing the application.

In an embodiment, the application deployment component 314 may generally include, without limitation, source code management (SCM) configuration component 314-1, code analysis component 314-2, image component 314-3, integration and deployment component 314-4, artifact repository component 314-5, and performance and testing component 314-6. These components may be operatively and/or communicatively coupled to each other and generally configured to: (1) provide an integration and testing workflow to continuously integrate, test, and deploy an application; (2) perform code analysis on the application source code and provide code analysis information to the application developers and their organization; and (3) enable the modification of the testing workflow to include test logic gates and provide testing as a service.

In an embodiment, the SCM configuration component 314-1 may be generally configured to enable the creation and/or provisioning of application source code data store (e.g., application source code data store 250) for storing application source code represented as application source code information (e.g., application source code information 260). The SCM configuration component 314-1 may be generally configured to provision an application source code data store in a public or private source code hosting facility (e.g., GitHub, GitLab, etc.) in response to receiving a request from the application orchestration component 312-1 during the initial creation and deployment of an application.

In an embodiment, the code analysis component 314-2 may be generally configured to perform code analysis (e.g., static code analysis using SonarQube, COMPUWARE Topaz, Twistlock, etc.) to analyze the application source code information (e.g., application source code information 260) stored in an application source code data store (e.g., application source code data store 250) in order to identify and report one or more errors in the source code (e.g., duplicate code, syntax errors, logic errors, memory leaks, security vulnerabilities, etc.). In an embodiment, the code analysis component 314-2 may be configured to analyze the application source code information and provide the code analysis information in response to a request to perform code analysis.

In an embodiment, the code analysis component 314-2 may be configured to perform code analysis: (1) immediately before and/or after the application source code information (e.g., application source code information 260) is built and tested; (2) during the application source code information build process and before the application is tested; or (3) after receiving a source code update event that indicates the application source code information has been updated in an application source code data store (e.g., application source code data store 250). Additionally or alternatively, the code analysis component 314-2 may be configured to automatically perform code analysis on a periodic basis (e.g., every hour, every eight (8) hours, every twenty-four (24) hours, etc.). In an embodiment, the code analysis component 314-2 may also be configured to provide the code analysis information to one or more application developers after performing a code analysis.

In an embodiment, the image component 314-3 may be generally configured to generate one or more container images that support the operation of a container application. The one or more container images may include, without limitation, one or more container OS images that are used to create a container instance hosted by a container engine (e.g., container engine 134) of a cluster node (e.g., cluster node 220-1 as a slave cluster node). The container OS images may generally include, without limitation, an image of an OS with customized configurations and a minimum amount OS services to support the execution of container applications and associated container components within a container instance.

In an embodiment, the integration and deployment component 314-4 may be an automation server configured to execute one or more customizable integration workflows and/or customizable testing workflows configured to automate the process of at least building and testing applications and facilitate the deployment of one or more applications in accordance to a deployment workflow. In an embodiment and during the initial creation of an application, the integration and deployment component 314-4 may be configured to create pipeline configuration information (e.g., pipeline configuration information 262) which may include, without limitation, integration workflow information that defines an integration workflow for the application and testing workflow information that defines a testing workflow for the application.

In an embodiment and with continued reference to the integration and deployment component 314-4, the created integration workflow may be configured to: (1) retrieve the application source code information (e.g., application source code information 260) from an application source code data store (e.g., application source code data store 250); (2) build or compile the retrieved application source code information; and (3) provide the output of the build process, i.e., binary artifacts information (e.g., binary artifact information 264) to the artifact repository component 314-5 for storage in an artifact data store (e.g., artifact data store 252), where the stored binary artifacts information may include, without limitation, the application built from the application source code information (e.g., application source code information 260); (4) test the built application with one or more testing applications in accordance with the testing workflow; and (5) generate testing result information that includes one or more test results from the execution of one or more test applications.

In an embodiment and after creating the pipeline configuration information, the integration and deployment component 314-4 may be configured to: (1) store the created pipeline configuration information (e.g., pipeline configuration information 262) in an application source code data store (e.g., application source code data store 250 that also stores the application source code information 260); (2) perform the one or more workflows of the pipeline configuration information to build and test the application; and (3) provide a deployment ready notification or generate a deployment ready event indicating that the application has successfully completed and passed testing workflow and the artifact data store 252 includes the application stored in a container application image for execution on container engines (e.g., container engines 134) or a native application package for installation and execution directly on a Guest OS (e.g., Guest OS 132) rather than on a container engine.

To enable at least continuous integration and testing, the integration and deployment component 314-4 may be further configured to: (1) detect changes or updates in the application source code data store (e.g., application source code data store 250) that indicate an update to the application source code information for an application; (2) retrieve the pipeline configuration information associated with the application source code information from the application source code data store; (3) perform the building and testing of the application in accordance with the retrieved pipeline configuration information; and (4) generate testing report information that includes one or more test results. Additionally or alternatively, the integration and deployment component 314-4 may be configured to automatically perform integration and testing on a periodic basis (e.g., every eight (8) hours, every twenty four (24) hours, etc.).

In an embodiment, the integration and deployment component 314-4 may also be configured to detect one or more binary repository update events during the execution or interpretation of the integration workflows and testing workflows. In response to the detection of binary repository update events, the integration and deployment component 314-4 may verify the set of generated build artifacts including an application for testing and initiate the execution or interpretation of the testing workflow to test the application.

In an embodiment, the integration and deployment component 314-4 may also be configured to generate a deployment ready event indicating that a container application image or native application package that includes the built and tested application has passed its associated testing workflow and is ready for deployment to an infrastructure services provider for use by clients, consumers, or customers of the application developer, which may be subsequently deployed by the infrastructure management component 318-1 to a provisioned or an existing cluster and accessible by consumer devices 108 via network 150.

In an embodiment and to determine the outcome of the deployment of an application, the integration and deployment component 314-4 may be generally configured to detect one or more deployment success events indicating the successful deployment of one or more applications to one or more designated clusters in an infrastructure services provider system. Additionally, the integration and deployment component 314-4 may also be configured to detect one or more deployment failure events indicating the failed deployment of one or more applications to one or more designated cluster in an infrastructure services provider system.

In an embodiment, the artifact repository component 314-5 may be generally configured to manage an artifact data store (e.g., artifact data store 252) and facilitate the storage of build artifacts represented as binary artifact information (e.g., binary artifact information 264) generated and used during integration and testing. In an embodiment and as previously discussed, the binary artifact information may include, without limitation, the native application package and/or container application image of the built application. In an embodiment, the artifact repository component 314-5 may also be configured to generate binary repository update events to report changes or updates to the binary repository.

In an embodiment, the performance and testing component 314-6 may be generally configured to modify the testing workflow information, manage one or more testing applications, and/or generate one or more test applications. In an embodiment, the one or more testing applications may be generally configured to perform testing of applications and components including one or more components of the AADDOMA 162 using various testing paradigms (e.g., black-box testing, grey-box testing, white-box testing, etc.) on individual components of an application (unit testing), multiple components of application (integration testing), and/or the entire application (system testing) with a variety of testing processes such as functional testing.

In an embodiment, the performance and testing component 314-6 may be configured to generate a test application based on API specifications information generated by the API generation component 312-3 for an application. In an embodiment, the generated test application may be configured to provide randomized input to the application to be tested via its APIs and monitor the responses for compliance with the API specifications information.

In an embodiment, the performance and testing component 314-6 may be configured to provide testing as a service by: (1) deploying the container application image or a package that includes the application to be tested to a development environment configured to simulate a production environment; (2) execute the generated test application to provide randomized input that simulates peak access patterns the application may experience via its APIs when the application is executing in a production environment; (3) monitor the responses of the container application to determine compliance with the API specifications information for the application; and (4) generate testing result information based on the determined compliance with the API specifications information for the application. In an embodiment, development environment may include, without limitation, one or more cluster nodes that are primarily used for testing the application and not used by the customers or clients of an application developer that created the application (e.g., users of one or more consumer devices 108). In an embodiment, the production environment may include, without limitation, one or more cluster nodes that are primarily used by the customers or clients of the application developer that created the application (e.g., users of one or more consumer devices 108).

In an embodiment, the performance and testing component 314-6 may be configured to modify a testing workflow of pipeline configuration information associated with an application to include, without limitation, testing as a service configured to deploy an application to a development environment for testing with input data and access patterns that simulate a production environment. Additionally or alternatively, the performance and testing component 314-6 may be further configured to enable the modification of the testing workflow of the pipeline configuration information associated with an application to include one or more test logic gates. The one or more test logic gates inserted into a testing workflow may be generally configured to control the progression through the testing workflow by the integration and deployment component 314-4 based on the test results of one or more test applications.

For example, the performance and testing component 314-6 may be configured to enable the insertion and configuration of a test logic gate in a testing workflow at the end of completion of one or more tests of the built application and prior to the deployment of the tested application to a cluster in an infrastructure services provider system. The inserted test logic gate may be configured to notify a designated user (e.g., DevOps Engineer, etc.) to provide manual approval at the end of the testing workflow before completion of the testing workflow and subsequent deployment of the application. Thus, upon the execution or interpretation of the test logic gate by the integration and deployment component 314-4 within a testing workflow, the integration and deployment component 314-4 may be configured to provide a test gate notification to a designated user (e.g., DevOps Engineer, etc.) of an organization associated with the application developer via a development device (e.g., development device 104-2, 104-3, etc.) to elicit approval to proceed beyond the test logic gate. In response to receiving the elicited approval from the development device associated with the designated user, the integration and deployment component 314-4 may execute or interpret additional tasks beyond the test logic gate as defined in the testing workflow such as deployment of the tested application to a cluster in an infrastructure services provider system.

In an embodiment, the application infrastructure component 318 may generally include: an infrastructure management component 318-1, application requirements component 318-2, capacity management component 318-3, and SCM provisioning component 318-4. These components may be operatively and/or communicatively coupled to each other and generally configured to: (1) create an application infrastructure for hosting one or more applications and deploy the one or more applications to the created application infrastructure; (2) estimate infrastructure needs based on created application infrastructure and automatically increase account limits; and (3) determine and provide the number of cluster nodes that will be required and the number of container instances that will be hosted by the cluster nodes for the application.

In an embodiment, the infrastructure management component 318-1 may be generally configured to execute or otherwise interpret infrastructure creation workflow information to create an application infrastructure for an application to be created within a designated infrastructure services provider system. As previously discussed, infrastructure creation information may define an infrastructure creation workflow. The infrastructure creation workflow may be configured to create, without limitation, a cluster that includes at least one slave cluster node and at least one master cluster node to execute the applications. The at least one master cluster node may be configured to execute a cluster management application (e.g., cluster management application 246) to manage at least one slave cluster node up to a maximum number of cluster nodes. Each slave cluster node may be configured to execute a cluster node application (e.g., cluster node application 244) to manage the execution of one or more container applications 136 and/or native applications 138 within their respective slave cluster node. The cluster node application of each slave cluster node may be configured to initiate, monitor, and maintain the execution of one or more applications on the respective slave cluster node. Additionally, the cluster node application of each slave cluster node may be configured to communicate with a master cluster node to provide high availability and scalability of one or more applications hosted on a slave cluster node.

In an embodiment, the infrastructure management component 318-1 may also be generally configured to execute or otherwise interpret deployment configuration information. As previously discussed, deployment configuration information may define a deployment workflow configured to deploy one or more applications to a cluster. Additionally, the deployment workflow may be transmitted to the newly created cluster or an existing cluster and executed or otherwise interpreted by the cluster node application and/or cluster management application including other container applications and/or native applications (e.g., package managers such as DEIS Helm, etc.) to deploy one or more applications to the slave cluster nodes. For example, the deployment workflow may be configured to deploy to one or more slave cluster nodes a telemetry application configured to collect metrics and logs generated by or associated with one or more applications, an overlay network application 242 configured to provide an overlay network to facilitate secure communications between and among one or more applications.

In an embodiment, the infrastructure management component 318-1 may be configured to: (1) receive a deployment ready notification; (2) detect a deployment ready event; or (3) detect changes or updates in the artifact data store 252, all indicating that the application has successfully completed and passed testing workflow and the artifact data store 252 includes the application stored in a container application image. In an embodiment, upon: (1) receiving the deployment ready notification; (2) detecting the deployment ready event; or (3) detecting changes or updates in the artifact data store 252, the infrastructure management component 318-1 may be configured to provide the deployment configuration information to the cluster and communicate with the cluster master node to deploy the container application image or a native application package stored in the artifact data store 252 to one or more slave cluster nodes for execution by their respective container engines or guest OSes in accordance with the deployment workflow defined in the deployment configuration information.

In an embodiment and after the deployment of the container application image or native application package by the infrastructure management component 318-1 has successfully completed, the infrastructure management component 318-1 may also be configured to generate a deployment success event indicating that the application has been successfully deployed to a designed cluster in an infrastructure services provider system. Additionally, the infrastructure management component 318-1 may also be configured to generate a deployment failure event indicating that the application has failed to be deployed to a designed cluster in an infrastructure services provider system.

In an embodiment, the infrastructure management component 318-1 may also configure one or more master cluster nodes with automatic horizontal scaling capable of scaling up the number of slave cluster nodes up to a maximum number and/or scaling down the number of slave cluster nodes to a minimum number. In such embodiments, the master cluster node may be configured to scale up the number of cluster nodes by automatically deploying additional container application images and/or native application packages to additional slave cluster nodes up to a maximum number of slave cluster nodes for the cluster, upon determining that one or more metrics of existing slave cluster nodes have exceeded a specific threshold limit (e.g., CPU utilization of all existing slave cluster nodes have exceed fifty (50) percent, seventy (70) percent, etc.).

Additionally or alternatively, the master cluster node may also be configured to scale down to a minimum number of cluster nodes by, for example, stopping the execution of container instances on slave cluster nodes in the cluster, upon determining that one or more metrics of existing slave cluster nodes have fallen below a specific threshold limit (e.g., CPU utilization of all existing slave cluster nodes have fallen below fifty (50) percent, seventy (70) percent, etc.) for a specific period of time (e.g., one hour, two hours, etc.). In such embodiments, the master cluster node may be further configured to scale down by stopping the execution of container application instances and/or native applications of only slave cluster nodes in the cluster that have been idle (e.g., zero (0) percent CPU utilization and/or no active or pending API requests or responses) for a specific period of time (e.g., one hour, two hours, etc.).

In an embodiment, the application requirements component 318-2 may be generally configured to: (1) receive application requirements information generated and provided by the application orchestration component 312-1; (2) generate application resource information based on the application requirements information; and (3) provide the generated application resource information. As previously discussed, the application resource information may include, without limitation, the number of cluster nodes required for an application, and the number of container instances to be hosted by the cluster nodes for the application.

In an embodiment, the capacity management component 318-3 may be generally configured to predict or estimate the amount of computing resources (e.g., number of server devices and/or guest OSes, etc.) of an infrastructure services provider that are to be purchased and allocated for use for all application developers and organizations. In an embodiment, the capacity management component 318-3 may be configured to predict the amount of computing resources required for a future time period based on the utilization of computing resources by all applications in a past time period. In an embodiment, the capacity management component 318-3 may also be configured to automatically increase the account limits or purchase additional computing resources from an infrastructure services provider based on predicted utilization for a future time period.

In an embodiment, SCM provisioning component 318-4 may be generally configured to host or create a private source code hosting facility (not shown) in the cloud platform system 160 generally configured to manage a private application source code data store (e.g., application source code data store 250). In an embodiment and as previously discussed, the SCM configuration component 314-1 may be configured to request the created private source code hosting facility to provision an application source code data store 250 for storing the application source code information 260 and associated pipeline configuration information 262.

In an embodiment, the application security component 316 may include, without limitation, credential management component 316-1, identity management component 316-2, certificate and access component 316-3, and vulnerability management component 316-4. These components may be generally configured to provide authorization, authentication, access control, and/or accounting. These components may be operatively and/or communicatively coupled to each other and generally configured to: (1) provide management of user credentials; (2) provide authentication, authorization, and access control to one or more APIs; and (3) determine and provide notifications of vulnerabilities and misconfigurations.

In an embodiment, the credential management component 316-1 may be generally configured to store, distribute, and manage credentials (e.g., user name and password, API access keys, etc.) of users of AADDOMA 162 (e.g., application developers of an organization, DevOps engineers of an organization, managers of an organization, executives of an organization, etc.). In an embodiment, the credential management component 316-1 may also be generally configured to enable credential auditing (e.g., remove inactive users, modify users from groups, etc.) on a periodic basis and enforce one or more expiration and rotation policies of credentials.

In an embodiment, identity management component 316-2 may be generally configured to provide authentication, authorization, and access control of users that access the one or more APIs of the AADDOMA 162. To provide authentication, authorization, and access control, the identity management component 316-2 may be configured to issue access tokens that provide access to one or more APIs of the AADDOMA 162 and/or one or more APIs of an application developer's application in accordance with one or more authorization standards (e.g., OAuth, etc.).

In an embodiment, the certificate and access component 316-3 may be generally configured to generate, provide, and/or manage digital certificates distributed to various components of the AADDOMA 162. The distributed digital certificates may be utilized by the various components to secure access between and among one or more components of the AADDOMA 162.

In an embodiment, the vulnerability management component 316-4 may be generally configured to scan for vulnerabilities and misconfigurations (e.g., malware, deprecated applications and components, etc.) in various applications components of the cloud platform system 160 and in one or more applications and associated components deployed in an infrastructure services provider system. Additionally or alternatively, the vulnerability management component 316-4 may be configured to continuously scan for vulnerabilities and misconfigurations in one or more components, in one or more data stores (e.g., application source code data store 250, artifact data store 252, template data store 254, etc.), and one or more applications in the infrastructure services provider systems. In an embodiment, the vulnerability management component 316-4 may also be configured to generate and provide the vulnerabilities assessment information to analysts, administrators, support staff, and developers of the cloud platform system 160.

In an embodiment, the application telemetry component 310 may generally include, without limitation, telemetry collection and storage component 310-1, notification and telemetry processing component 310-2, event stream component 310-3, telemetry visualization component 310-4, and long-term telemetry storage component 310-5. These components may be operatively and/or communicatively coupled to each other and generally configured to: (1) collect and store telemetry information from various components and applications; (2) provide visualization of collected telemetry information (3) analyze collected telemetry information and provide notifications when one or more breaching conditions occurs and the occurrence of one or more breaching conditions requires a notification; (4) and facilitate the communication of events to and from various components of the AADDOMA 162.

In an embodiment, the telemetry collection and storage component 310-1 may be generally configured to monitor health of various components of AADDOMA 162, cluster nodes, and applications. To monitor the health, the telemetry collection and storage component 310-1 may be configured to receive telemetry information from telemetry application 240 one or more cluster nodes and various components of the AADDOMA 162 and store the received telemetry information in a short-term telemetry data store (not shown). In an embodiment, the telemetry information may include one or more metrics (e.g., CPU utilization, disk I/O, network I/O, memory usage) and one or more logs (e.g., API access log, authentication log, etc.). In an embodiment, each metric may be represented a time series of data points for a particular resource (e.g., an application, guest OS, container instance, server device, etc.). In an embodiment, each log may be represented as a time series of occurrences of one or more events (e.g., request, responses, actions, etc.).

In an embodiment, the telemetry collection and storage component 310-1 may be configured to enforce data retention and/or lifecycle policies by removing stored telemetry information after a set time period. Additionally or alternatively, the telemetry collection and storage component 310-1 may also be configured to transfer the stored telemetry information in the short-term telemetry data store to a long-term telemetry data store (not shown) managed by the long-term telemetry storage component 310-5.

In an embodiment, the event stream component 310-3 may be generally configured to facilitate component communications by receive events (e.g., source code update event, deployment ready event, deployment success event, deployment failure event, logging events that include logs and metrics, etc.) published by one or more event publishers indicating the occurrence of one or more changes and/or mutations to one or more components and/or associated data stores of the AADDOMA 162. Additionally, the event stream component 310-3 may also be generally configured to publish the received events to one or more event listeners of the AADDOMA 162. In an embodiment, the one or more event publishers and event listeners may include, without limitation, one or more applications deployed in one or more cluster nodes and various components of the AADDOMA 162. In an embodiment, the event stream component 310-3 may also be configured to store the received events as global event stream information in an global event stream data store (not shown). In an embodiment, the stored global event stream information may be organized as a time series of occurrences of the one or more events so that it may be correlated with the stored telemetry information.

In an embodiment, the notification and telemetry processing component 310-2 may be generally configured to process the telemetry information and global event stream information and determine the occurrence of one or more breach conditions whether one or more metrics, logs, and/or events includes data points or entries that meets and/or exceeds a threshold value defined for a particular metric, log, and/or event within a particular time frame. Additionally or alternatively, the notification and telemetry processing component 310-2 may also be configured to perform predictive and trend based analytics by utilizing one or more machine learning algorithms (e.g., regression algorithms, decision tree algorithms, Bayesian algorithms, etc.). The telemetry information and/or global event stream information may be utilized by the notification and telemetry processing component 310-2 to train the one or more machine learning algorithms in order to predict an occurrence of one or more breach conditions before they occur.

Based on the occurrence and/or predicted occurrence of one or more breaching conditions, the notification and telemetry processing component 310-2 may be further configured to provide an alarm notification to various users of the AADDOMA 162 as well as analysts, administrators, support staff, and developers of the AADDOMA 162.

In an embodiment, the telemetry visualization component 310-4 may be generally configured to provide, in one or more GUIs, visualizations of collected telemetry information for debugging, performance monitoring, and performance optimizations. Additionally or alternatively, the telemetry visualization component 310-4 may be configured to correlate collected telemetry information with stored global event stream information and visually present the combination in one or more GUIs. In an embodiment, the telemetry visualization component 310-4 may provide the collected telemetry information in one or more GUIs to various users of the AADDOMA 162 as well as analysts, administrators, support staff, and developers of the AADDOMA 162.

In an embodiment, the long-term telemetry storage component 310-5 may be generally configured to provide a cost effective long-term telemetry data store to store telemetry information. In an embodiment, the long-term telemetry storage component 310-5 may be configured to store the telemetry information in compliance with standards and policies set forth by the application developer's organization, and the application developer's clients, customers, or consumers, and/or industry.

Figure 4:
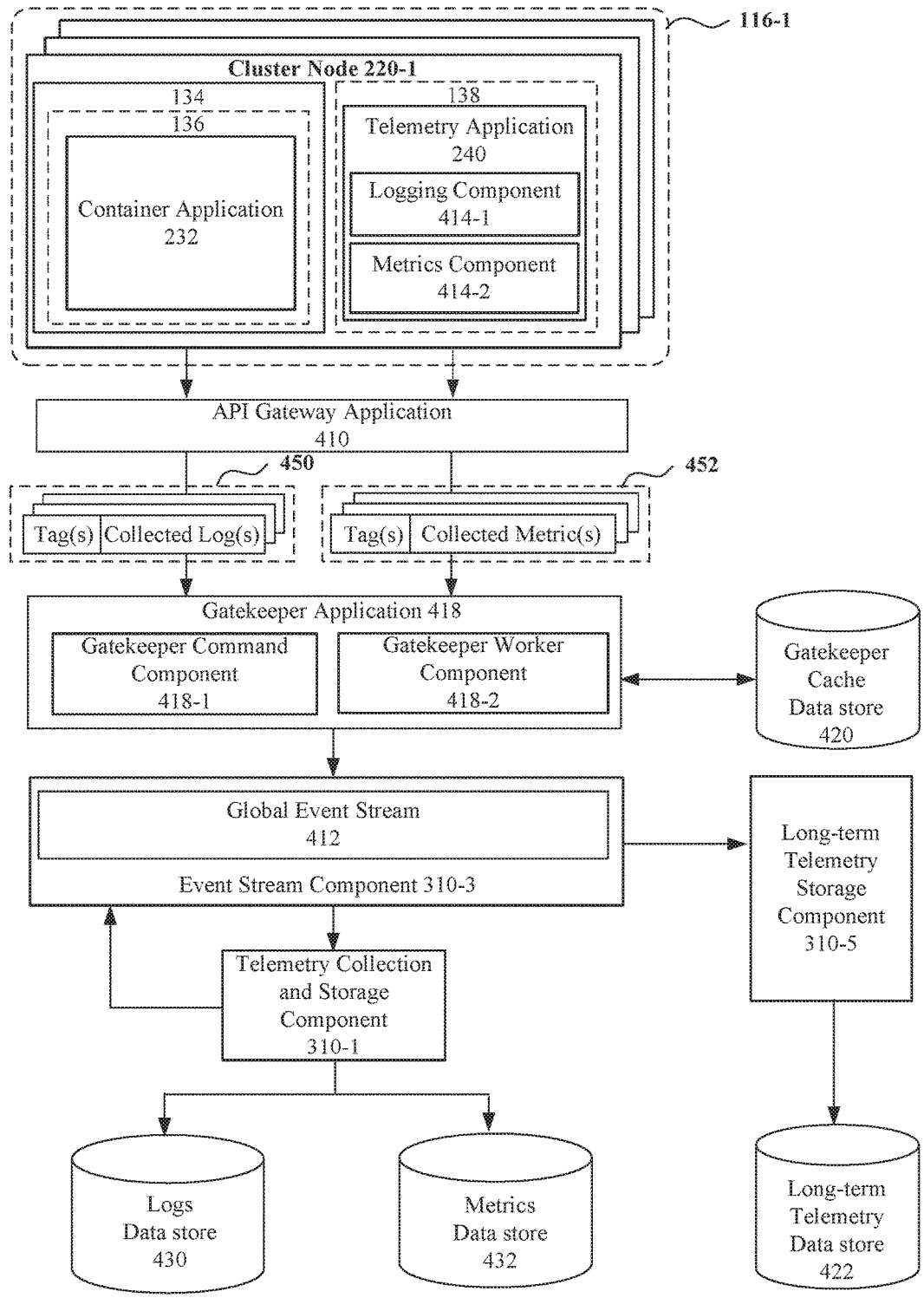
FIG. 4 illustrates a system for rapid and asynchronous multitenant telemetry collection and storage in an example embodiment.

FIG. 4 illustrates a system for rapid deployment rapid asynchronous multitenant telemetry collection and storage in an example embodiment. In FIG. 4, the system 400 may include, without limitation, an infrastructure services provider system 116-1, an API gateway application 410, a gatekeeper application 418, an event stream component 310-3, a telemetry collection and storage component 310-1, and a long-term telemetry storage component 310-5.

In an embodiment and as previously discussed, the infrastructure services provider system 116-1 include one or more cluster nodes (e.g., cluster node 220-1), which may execute one or more container applications 136 in one or more container engines 134. The one or more container applications 136 may include, without limitation, custom container application 232. The infrastructure services provider system 116-1 may also include native applications 138, which may include, without limitation, telemetry application 240. Additionally or alternatively, while not illustrated, it may be appreciated that the telemetry application 240 may also be deployed and hosted as a container application 160 for execution in the one or more container engines 134.

In an embodiment, the telemetry application 240 may be generally configured to collect telemetry information from one or more deployed container applications and/or native applications (or their associated components). In an embodiment, the telemetry information may include, without limitation, logs information and metrics information. To collect the telemetry information, the telemetry application 240 may include, without limitation, logging component 414-1 and metrics component 414-2. The logging component 414-1 may be configured to process (e.g., parse and/or index, etc.) the collected or aggregated logs information (e.g., application events and/or logs) that may be generated from various container applications 136 and/or native applications 138 and their associated components in a cluster node (e.g., cluster node 220-1, etc.). For example, the logs information may include, without limitation, one or more standard streams (e.g., standard output, standard error, etc.) associated with container applications 136 and/or native applications 138 and their associated components in a cluster node (e.g., cluster node 220-1, etc.) configured to generate output logs, error logs, and API access logs.

In an embodiment, the logs information may further include, without limitation, a resource identifier (e.g., a unique identifier associated with or that identifies a particular resource such as an application, guest OS, container instance, server device or any other hardware and/or software resources, which may be used by one or more container applications 136 and/or native applications 138 and their associated components), application name information (e.g., name of the application, microservice, or component), time stamp information (e.g., a time stamp indicating when a log was generated, a time stamp for each entry in a log indicating when that logged entry occurred, etc.), version information (e.g., version of an application or component associated with the application), stream information (e.g., access logs, application technical logs, application business event details, etc.), and/or any other logs information that an application developer may request to collect from their deployed applications.

In an embodiment, the metrics component 414-2 may be configured to process and index the collected or aggregated metrics information that may be generated from various container applications 136 and/or native applications 138 in a cluster node (e.g., cluster node 220-1, etc.). In an embodiment, the collected metrics information for one or more container applications 136 and/or native applications 138 may include, without limitation, application performance information such as application CPU usage information (e.g., average amount of CPU time or average percent CPU utilization that the application is using for a given period of time), application memory usage information (e.g., amount of memory such as heap memory or paged memory used by an application, etc.), application network utilization, application network latency information (e.g., delay associated with communications between various devices and one or more container applications 136 and/or native applications 138), application memory consumption information (e.g., memory usage, swap memory usage, etc.), and/or any other application performance information that an application developer may request to collect from their deployed applications.

In an embodiment, the collected metrics information may further include, without limitation, application statistics information which may include, page hits information (e.g., number of times a web page hosted by a application is accessed or otherwise downloaded, etc.), page counts information (e.g., number of times a particular resource on a web page hosted by the application is accessed or otherwise downloaded, etc.), application uptime information (e.g., amount of time the application has been available or otherwise operational, etc.), request characteristics information (e.g., request queue depth, request response time, etc.), application service limits information (e.g., limitation on number of requests for a particular unit or period of time, limitation on number of cluster nodes available, limitation on number of databases, etc.), message volume information (e.g., number of HTTP messages such as a total number of HTTP requests received and HTTP responses transmitted, etc.), and/or HTTP queries information (e.g., a number of HTTP queries, a number of active HTTP queries, etc.), and/or any other application statistics information that an application developer may request to collect from their deployed applications.

In an embodiment, the collected telemetry information (e.g., the collected logs information, the collected metrics information, etc.) may be associated with telemetry tag information (or telemetry tags information), which may generally identify one or more sources of the collected telemetry information. The one or more sources may generally include, without limitation, identification of a particular container application 136 or native application 138 itself (or an associated component of the container application 136 or native application 138) that is hosted or being executed on a cluster node and that also generated the telemetry information (i.e., application execution identifier as further discussed herein).

In an embodiment and in addition to collecting logs information and metrics information, the telemetry application 240 (e.g., the logging component 414-1 and/or metrics component 414-2) may also be configured to generate telemetry tag information associated with the collected logs information and collected metrics information. For example, the telemetry application 240 may be configured to generate the telemetry tag information by querying and retrieving application execution information associated with the application. For example, the telemetry application 240 may query a container engine or a guest OS that hosts or otherwise executes the particular container application or native application that generated the collected logs information and/or collected metric information for the application execution information. Additionally, the telemetry application 240 may also be configured to generate telemetry tag information by querying and retrieving other descriptive information associated with the particular container application or native application stored in an application tag data store (not shown), which may be implemented, for example, as a key-value data store configured to store one or more application tag attribute-value pairs.

In an embodiment, the telemetry tag information may include, without limitation, the application execution information. The application execution information may include, without limitation, an application execution identifier (e.g., a unique alphanumeric and/or hexadecimal identifier) that uniquely identifies the particular container application or a native application assigned by a container engine or a guest OS hosting or otherwise executing the application that generated the telemetry information.

In an embodiment, the application execution information may also include, without limitation, an application name associated with the particular container application or native application, an application execution command identifying the command and associated parameters that initiated the execution of the particular container application or native application, an application version identifying a version of the particular container application or native application that is being hosted or executed, an application image identifier (e.g., a unique alphanumeric and/or hexadecimal identifier) that uniquely identifies a container application image associated with the container application that is being hosted or executed, and/or an application cluster identifier identifying a cluster of one or more cluster nodes that hosts or otherwise executes the particular container application or the native application.

In an embodiment, telemetry tag information may further include, without limitation, application tag information which may generally include, without limitation, a business unit identifier that identifies a business unit associated with the particular container application or native application, a workload component identifier that identifies a workload component, a pre-agreed telemetry output source identifier provided by an owner of the particular container application or native application to assist the owner in identifying the output source (e.g., one or more streams such as standard output stream, standard error stream, log file, etc.) of the telemetry information to be collected from their container application or native application, and/or any other identifiers or descriptive information that may be associated with a particular container application or native application that is being hosted or otherwise executed.

In an embodiment, the collected metrics information and collected logs information and their associated telemetry tag information may be temporarily stored in a cached telemetry data store (not shown) in the infrastructure services provider system. For example, the cached telemetry data store may be hosted or otherwise managed by a cluster node (e.g., cluster node 220-1) utilizing a local storage device on that cluster node (e.g., cluster node 220-1) or one or more other cluster nodes dedicated for the storage of logs information and/or metrics information and their associated telemetry tag information.

In an embodiment, the logging component 414-1 and the metrics component 414-2 may also be generally configured to generate one or more telemetry collection events. The one or more telemetry collection events may be representative of one or more logs collection events (e.g., one or more logs collection events 450) generated based on the collected logs information and/or one or more metrics collection events (e.g., one or more metrics collection events 452) generated based on the collected metrics information.

In an embodiment, each logs collection event (e.g., logs collection event 450-1, 450-2, . . . , 450-$j$) may include, without limitation, one or more collected logs representative of collected logs information and one or more telemetry tags representative of telemetry tag information (or telemetry tags information) associated with the one or more collected logs. Similarly, each metrics collection event (e.g., metrics collection event 452-1, 452-2, . . . , 452-$k$) may include, without limitation, one or more collected metrics representative of collected metrics information and one or more telemetry tags representative of telemetry tag information (or telemetry tags information) associated with the one or more collected metrics.

In an embodiment and to transmit the one or more telemetry collection events to the telemetry collection and storage component 310-1 for storage, the telemetry application 240 may generate one or more telemetry storage requests, where each generated telemetry storage request may include the one or more telemetry collection events. As previously discussed, the one or more telemetry collection events may be representative of one or more generated logs collection events 450 and/or one or more generated metrics collection events 452. In an embodiment and after generating the one or more telemetry storage requests, the telemetry application 240 may also transmit the one or more generated telemetry storage requests to the telemetry collection and storage component 310-1 via the API gateway application 410, gatekeeper application 418, and the event stream component 310-3 for storage.

In an embodiment, the API gateway application 410 may be generally configured to provide an API to access one or more components of the AADDOMA 162 and/or applications associated with the AADDOMA 162 via one or more requests and/or responses. The API gateway application 410 may be configured to validate incoming requests from one or more infrastructure services provider systems 116 during runtime in accordance with associated API specifications information and one or more programming paradigms. Once validated, the API gateway application 410 may then forward the incoming requests to one or more appropriate application and/or components (e.g., gatekeeper application 418).

In an embodiment, the API gateway application 410 may be configured to receive one or more telemetry storage requests to store collected telemetry information from one or more telemetry applications (e.g., telemetry application 240) of one or more infrastructure services provider systems 116 (e.g., one or more infrastructure services provider systems 116-1). As previously discussed, each telemetry storage request may include, without limitation, one or more generated logs collection events 450 and/or one or more generated metrics collection events 452, where each of the collection events may include the collected telemetry information (e.g., collected logs information, collected metrics information, etc.) and the associated telemetry tag information. To ensure that the received telemetry information is transmitted as soon as possible to the relevant application and/or components, the API gateway application 410 may be further configured to perform runtime validation of the one or more telemetry storage requests. After validation, the API gateway application 410 may be configured to transmit the validated telemetry storage request to the gatekeeper application 418.

In an embodiment, the gatekeeper application 418 may generally include, without limitation, a gatekeeper command component 418-1 and gatekeeper worker component 418-2. In an embodiment, the gatekeeper command component 418-1 and gatekeeper worker component 418-2 may be configured to operate independently and asynchronously with respect to each other. Stated differently, the gatekeeper command component 418-1 may be configured to process incoming one or more telemetry storage requests and enqueue the incoming requests into the gatekeeper command queue, while (e.g., before, during, after, etc.) the gatekeeper worker component 418-2 may be configured to process the incoming requests enqueued in the gatekeeper command queue. To facilitate the independent and asynchronous operation of the gatekeeper command component 418-1 and gatekeeper worker component 418-2, each of the components 418-1 and 418-2 may include, without limitation, one or more threads of execution and/or one or more processes.

It may be appreciated that by configuring gatekeeper command component 418-1 and gatekeeper worker component 418-2 to operate independently and asynchronously, the gatekeeper application 418 may rapidly process and enqueue the incoming telemetry storage requests from multiple telemetry applications of multiple cluster nodes for multiple tenants with minimal delay. Similarly, the gatekeeper worker component 418-2 may also rapidly publish the logs collection events and metrics collection events for multiple tenants to the global event stream 412, without adversely affecting the gatekeeper command component 418-1 in the processing and enqueuing of the incoming the incoming telemetry storage requests.

In an embodiment, the gatekeeper command component 418-1 may be generally configured to receive and enqueue incoming requests into the gatekeeper command queue independently and asynchronously with respect to the gatekeeper worker component 418-2. In an embodiment, the gatekeeper command component 418-1 may be configured to receive the one or more telemetry storage requests transmitted by the one or more telemetry applications (e.g., telemetry application 240) via the API gateway application 410 and queue the received one or more telemetry storage requests into a gatekeeper command queue which may, for example, be locally maintained in one or more data stores (e.g., a data store implemented with Apache Kafka, etc.) operatively coupled to the gatekeeper application 418. In an embodiment, the gatekeeper command queue may be configured to store one or more received telemetry storage requests which may then be independently and asynchronously processed by the gatekeeper worker component 418-2.

In an embodiment and after successfully enqueuing a telemetry storage request, the gatekeeper command component 418-1 may be configured to transmit a telemetry storage success response to the respective telemetry application (e.g., telemetry application 240 of cluster node 220-1) indicating that the telemetry storage request has been properly received and queued, in response to the telemetry storage request. Additionally or alternatively, when the gatekeeper command component 418-1 fails to queue the telemetry storage request in the gatekeeper command queue, the gatekeeper command component 418-1 may be configured to transmit telemetry storage failure response to the respective telemetry application (e.g., telemetry application 240 of cluster node 220-1) that transmitted the telemetry storage request. The telemetry storage failure response may indicate that the telemetry storage request has not been properly queued as result of one or more hardware and/or software failures within the gatekeeper application 418 and/or associated components. In response to receiving the telemetry storage failure response, the respective telemetry application that transmitted the telemetry storage request may be configured to cache or temporarily store the telemetry storage request for re-transmission at a different time period (e.g., one (1) hour later, two (2) hours later, twenty-four (24) hours later, etc.).

In an embodiment, the gatekeeper worker component 418-2 may be generally configured to process the gatekeeper command queue independently and asynchronously with respect to the gatekeeper command component 418-1. In an embodiment, the gatekeeper worker component 418-2 may be configured to retrieve the one or more queued telemetry storage requests from the gatekeeper command queue and cache the received one or more telemetry collection events in each telemetry storage request into a gatekeeper cache data store 420. Each cached telemetry collection events may include, without limitation, telemetry information (e.g., logs information and/or metrics information, etc.) and associated telemetry tag information. In an embodiment, the gatekeeper cache data store 420 may be configured to store the one or more telemetry collection events (including respective telemetry information and associated telemetry tag information) received from one or more telemetry applications (e.g., telemetry application 240) with high availability (e.g., hardware/software redundancy with fault tolerance to maximize availability and minimize down time, etc.) and redundancy of the gatekeeper cache datastore 420 (e.g., replication and/or mirroring to reduce the probability of unrecoverable data loss, etc.).

In an embodiment, gatekeeper worker component 418-2 may be configured to generate a decorated telemetry collection event based at least partially on the telemetry information and associated telemetry tag information within each respective event. In an embodiment, the decorated telemetry collection event may generally assist in the identification of telemetry information (e.g., logs information, metrics information, etc.) received from one or more telemetry applications (e.g., telemetry application 240). In an embodiment, the decorated telemetry collection event may include, without limitation, a decorated logs collection event and a decorated metrics collection event.

For example, gatekeeper worker component 418-2 may generate the decorated logs collection event by decorating the logs collection event with decorated telemetry tag information. Thus, the decorated logs collection event may include, without limitation, logs information, associated telemetry tag information, and the decorated telemetry tag information. Similarly and continuing with the above example, gatekeeper worker component 418-2 may also generate the decorated metrics collection event by decorating the metrics collection event with the decorated telemetry tag information. Thus, the decorated metrics collection event may include, without limitation, metrics information, associated telemetry tag information, and the decorated telemetry tag information.

In an embodiment and to generate a decorated telemetry collection event (e.g., a decorated logs collection event, a decorated metrics collection event, etc.), the gatekeeper worker component 418-2 may be generally configured to decorate a received telemetry collection event (i.e., the decorated telemetry collection event) by: (1) generating information that includes contextual information from one or more hierarchical contextual layers; and (2) adding that information to the received telemetry collection event (e.g., received logs collection event, received metrics collection event, etc.). The one or more hierarchical contextual layers may include, without limitation, application contextual layer, group contextual layer, service contextual layer, node contextual layer, and/or tenant contextual layer. The one or more hierarchical contextual layers may also be arranged in one or more hierarchical orders.

For example, the first contextual layer or the lowest contextual layer may be representative of application contextual layer, which may include, without limitation, information regarding the container application and/or native application such as application execution information received from a telemetry application (e.g., telemetry application 240). The next or second contextual layer, for example, may be representative of group contextual layer, which may include, without limitation, information regarding a set or a group of one or more container applications and/or native applications that may be operatively and/or communicatively coupled together to provide at least one service.

The next or third contextual layer may be representative of service contextual layer, which may include, without limitation, information regarding the at least one service that is provided by the set or group of the container application and/or native application. The next or fourth contextual layer may be representative of a node contextual layer, which includes, without limitation, information regarding the one or more cluster node(s) hosting or otherwise executing the container application and/or native application.

The next or fifth contextual layer may include, without limitation, information regarding a cluster that includes the one or more cluster node(s) that hosts or otherwise executes the container application and/or native application. The next or sixth contextual layer may be representative of tenant contextual layer which may include, without limitation, information regarding the tenant that is associated with the container application and/or native application.

In an embodiment, the decorated telemetry tag information may generally include information from the sixth or tenant contextual layer which may identify an owner of an application (or an associated component of the application) that is associated with the logs information and/or metrics information. For example, the decorated telemetry tag information may include, without limitation, information identifying an application developer that manages the application (or the associated component of the application) that generated the telemetry information (i.e., a user identifier), and identification of a tenant that the application developer is associated with (i.e., a tenant identifier). In an embodiment, the decorated telemetry tag information may include, without limitation, a tenant identifier that identifies a set of one or more applications and/or one or more components that are associated with an application developer that deployed at least one of the one or more applications.

In an embodiment, the tenant may represent a group of one or more application developers within an organization that manages (e.g., maintains the source code, tests, deploys, updates, etc.) the deployed application having common access and/or privileges to the deployed application. For example, one or more container applications 136 and/or one or more native applications 138 may belong to a tenant having an associated tenant identifier that may be assigned by the AADDOMA 162 such as, for example, assigned by account provisioners component 312-6 when a user created an account. Continuing with the example, the user may be the application developer that deployed at least one of the one or more applications.

In an embodiment, the decorated telemetry tag information may also include, without limitation, a user identifier that identifies an application developer that is associated with the deployed application. The application developer may be a member of a group of one or more application developers within an organization that manages (e.g., maintains the source code, tests, deploys, updates, etc.) a deployed application having common access and/or privileges to the deployed application. Thus, the user identifier may identify a particular application developer within a tenant having an associated tenant identifier, and that application developer may be responsible for the management of one or more applications and/or one or more components including the deployed application.

In an embodiment, the decorated telemetry tag information may further include, without limitation, event time stamp information (e.g., time stamp indicating when the event was created and/or received, etc.), version information (e.g., version of an application or component associated with the application etc.), event index information (e.g. date-driven segments for storage segmentation, etc.), event type information (e.g., a type identifier such as a string or sequence of alphanumeric characters that identifies this event as a decorated logs collection event, etc.), and/or origination identifier information (e.g., an identifier that identifies an application or component that generated the event, etc.).

In an embodiment, the gatekeeper worker component 418-2 may be configured to generate the decorated telemetry tag information (e.g., the tenant identifier, user identifier, etc.) based on information in one or more hierarchical contextual layers. For example, the gatekeeper worker component 418-2 may be configured to generate the decorated telemetry tag information based at least partially on information in the application contextual layer which may include, without limitation, the telemetry tag information including application execution information received from a telemetry application in one or more telemetry collection events. For example to generate the decorated telemetry tag information, the gatekeeper worker component 418-2 may be configured to request the decorated telemetry tag information based on at least a portion of the telemetry tag information (e.g., application execution information such as application execution identifier, etc.). The request may be communicated to one or more components of the AADOMA 162 (e.g., account provisioners component 312-6, application registry component 312-2, etc.) and/or cluster management application 246 associated with the cluster node 220-1. In response to the request, the respective component and/or application may respond with the decorated telemetry tag information associated with the telemetry tag information.

Additionally or alternatively, while the gatekeeper worker component 418-2 may request the decorated telemetry tag information, a portion of the decorated telemetry tag information may also be transmitted by the logging component 414-1 or metrics component 414-2 as part of the telemetry tag information. For example, instead of the gatekeeper worker component 418-2 requesting the tenant identifier and/or user identifier of the decorated telemetry tag information, these identifiers (or other identifiers) may be part of the telemetry tag information that is transmitted by the logging component 414-1 or metrics component 414-2. The example is not limited to this context.

In an embodiment, the gatekeeper worker component 418-2 may also be configured to publish the one or more decorated telemetry collection events (e.g., decorated logs collection events, decorated metrics collection events, etc.) to a global event stream 412 managed by an event stream component 310-3. To publish the decorated telemetry collection events, the gatekeeper worker component 418-2 may transmit the one or more decorated telemetry collection events to the event stream component 310-3 configured to manage the global event stream 412. After the one or more decorated telemetry collection events are published to the global event stream 412, one or more components (e.g., telemetry collection and storage component 310-1) such as telemetry collection and storage component 310-1 may be configured to receive, process, and/or store the one or more decorated telemetry collection events. Additionally, the gatekeeper worker component 418-2 may also be configured to remove or dequeue the telemetry storage request from the gatekeeper command queue after successfully publishing the decorated telemetry collection events that have been successfully published to the global event stream 412.

In an embodiment and as previously discussed, the event stream component 310-3 may be configured to store the received events as global event stream information in a global event stream data store (not shown). It may be appreciated that the global event stream information stored in a global event stream data store may be represented as the global event stream 412. In an embodiment and as previously discussed, the stored global event stream information may be organized as a time series of occurrences of the one or more events such as telemetry collection events so that it may be correlated with the stored telemetry information. Additionally, the one or more events such as telemetry collection events, the event stream component 310-3 may also remove one or more events after specific time period (e.g., one (1) hour, two (2) hours, twenty-four (24) hours, etc.) has elapsed and/or that a telemetry storage success event has been received from the telemetry collection and storage component 310-1.

To provide a cost effective long-term telemetry data store and in an embodiment, the long-term telemetry storage component 310-5 may be operatively coupled to the event stream component 310-3 and generally configured to listen to telemetry collection events published in the global event stream 412 by, for example, receiving one or more telemetry collection events and temporarily caching the one or more received telemetry collection events in a short-term telemetry data store. The long-term telemetry storage component 310-5 may then be configured to store one or more received telemetry collection events to a long-term telemetry data store 422 after a specific time period (e.g., one (1) hour, two (2) hours, twenty-four (24) hours, etc.) has elapsed for each telemetry collection event cached in the short-term telemetry data store, which may correspond with the removal of the one or more events from the global event stream 412 by the event stream component 310-3.

Additionally or alternatively and as previously discussed, the telemetry collection and storage component 310-1 may be configured to temporarily cache the one or more received telemetry collection events in a short-term telemetry data store and store the events to a long-term telemetry data store 422 after a specific time period has elapsed for each telemetry collection event cached in the short-term telemetry data store. In an embodiment, the transfer of telemetry information stored in the short-term telemetry datastore to the long-term telemetry data store 422 may occur via the global event stream 412.

In an embodiment, the telemetry collection and storage component 310-1 may be configured to process the telemetry collection events published to the global event stream 412. Moreover, the telemetry collection and storage component 310-1 may be configured to store the logs information, associated decorated telemetry tag information, and associated telemetry tag information in a logs data store 430. The logs data store 430 may be configured as a multitenant data store and further configured to enable real-time searching of stored logs information with high availability (e.g., hardware/software redundancy with fault tolerance to maximize availability and minimize down time, etc.) and redundancy (e.g., replication and/or mirroring to reduce the probability of unrecoverable data loss, etc.). In an embodiment, the telemetry collection and storage component 310-1 may also be configured to store the metrics information, associated decorated telemetry tag information, and associated telemetry tag information in a metrics data store 432. The metrics data store 432 may also be configured as a multi-tenant data store and further configured to store the metrics information, associated decorated telemetry tag information, and associated telemetry tag information as a time-series with high availability (e.g., hardware/software redundancy with fault tolerance to maximize availability and minimize down time, etc.) and redundancy (e.g., replication and/or mirroring to reduce the probability of unrecoverable data loss, etc.).

In an embodiment, the telemetry collection and storage component 310-1 may be configured to implement a data retention policy that may define availability of telemetry information for a specific period of time based on telemetry storage configuration information and time stamp information associated with the telemetry information (e.g., event time stamp information, etc.). The telemetry storage configuration information may include, without limitation, retention time limit identifying a period of time (e.g., twenty-four (24) hours, forty-eight (48) hours, three (3) days, one (1) week, one (1) month, etc.) starting from the time stamp information associated with the telemetry information (e.g., logs information, metrics information, etc.).

In an embodiment, upon determination by the telemetry collection and storage component 310-1 that specific telemetry information has exceeded the retention time limit (i.e., expired telemetry information), the telemetry collection and storage component 310-1 may be configured to remove the expired telemetry information from the logs data store 430 and the metrics data store 432. Thus, the telemetry collection and storage component 310-1 may limit the availability of stored telemetry information stored within the logs data store 430 and the metrics data store 432 to a set period of time based on telemetry storage configuration information.

It may be appreciated that after any expired telemetry information has been removed from the logs data store 430 and/or the metrics data store 432, the telemetry collection and storage component 310-1 may be configured to retrieve or otherwise receive any previously removed telemetry information from the long-term telemetry storage component 310-5 that are stored in the long-term telemetry data store 310-5. This may enable faster access to the telemetry information for visualization in one or more GUIs as further discussed with respect to the telemetry visualization component 310-4.

In an embodiment, after the logs information or the metrics information have been successfully stored for a respective logs collection event or metrics collection event, the telemetry collection and storage component 310-1 may also be configured to publish a telemetry storage success event to the global event stream 412 indicating that the respective logs collection event or metrics collection event has been processed and has been properly stored in the respective logs data store 430 or metrics data store 432. Additionally or alternatively, the telemetry collection and storage component 310-1 may publish a telemetry storage failure event to the global event stream 412 indicating a failure to store the respective logs information or metrics information.

In an embodiment and as previously discussed, after the logs information and/or metrics information have been stored, the notification and telemetry processing component 310-2 (shown in FIG. 3) may be configured to process the telemetry information stored in the logs data store 430 and the metrics data store 432 in combination with the global event stream information to determine the occurrence of one or more breach conditions. In an embodiment and as previously discussed, based on the occurrence and/or predicted occurrence of one or more breaching conditions, the notification and telemetry processing component 310-2 may be further configured to provide an alarm notification to various users of the AADDOMA 162.

In an embodiment and as previously discussed, the telemetry visualization component 310-4 (shown in FIG. 3) may also be configured to provide, in one or more GUIs, visualizations of collected telemetry information stored in the logs data store 430 and the metrics data store 432 for debugging, performance monitoring, and performance optimizations. It may be appreciated that while the system of FIG. 4 has been in the context of cluster node 220-1, telemetry application 240, and container application 232, the system is not so limited in this context. For example, the gatekeeper application 418 and associated applications and components, which are configured to facilitate rapid asynchronous telemetry collection and storage, may receive and process sequentially and/or simultaneously, telemetry storage requests from multiple cluster nodes 220 of multiple tenants. Thus, the above discussed embodiments are not limited to the context of FIG. 4.

Example Method

Figure 5:
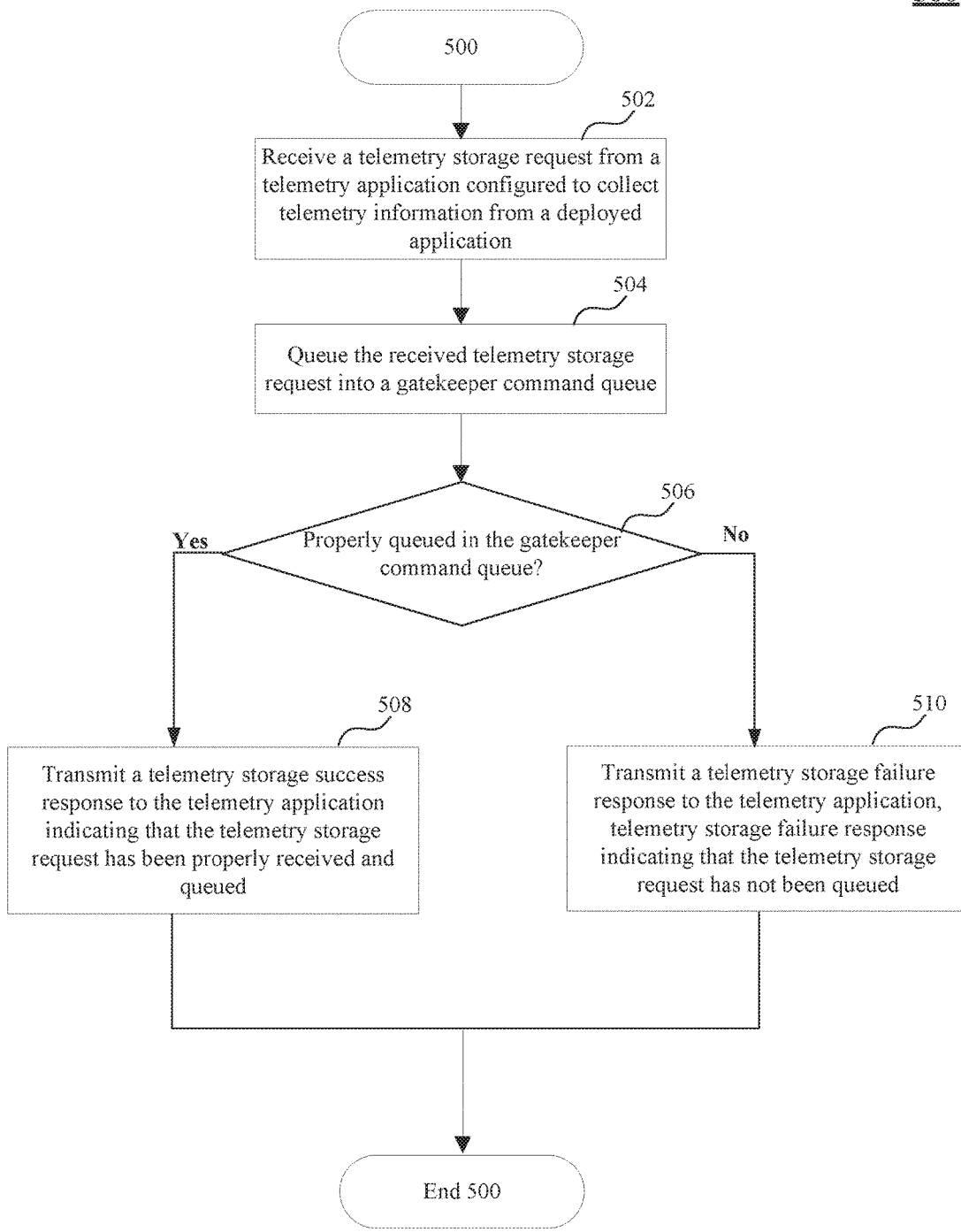
FIG. 5 illustrates an example method for rapid and asynchronous multitenant telemetry collection and storage in an example embodiment.

FIG. 5 illustrates an example method 500 for rapid asynchronous multitenant telemetry collection and storage, according to an embodiment. The example method 500 may be performed or otherwise implemented by the gatekeeper application 418 (e.g., gatekeeper command component 418-1), which may be a software application such as, for example, a container application or native application, as discussed with respect to FIGS. 1 and 2. It is to be appreciated that not all stages may be needed to perform the disclosure provided herein. Further, some of the stages may be performed simultaneously, or in a different order than shown in FIG. 5, as will be understood by a person of ordinary skill in the art. In some embodiments, method 500 may be performed by AADDOMA 162 of FIG. 1 and/or the gatekeeper application 418 of FIG. 4.

At stage 502, the method 500 may receive a telemetry storage request from a telemetry application configured to collect telemetry information from a deployed application. For example, the gatekeeper command component 418-1 of the gatekeeper application 418, may receive a telemetry storage request from a telemetry application 240 configured to collect telemetry information from a deployed application (or a component associated with the deployed application). The telemetry storage request may include, without limitation, one or more telemetry collection events (e.g., one or more logs collection events 450, one or more generated metrics collection events 452, etc.), where each telemetry collection event may include, without limitation, telemetry information collected by a telemetry application 240 with respect to the deployed application (or a component associated with the deployed application) and an associated telemetry tag information generated by the telemetry application (e.g., telemetry application 240).

At stage 504, the method 500 may queue the received telemetry storage request into a gatekeeper command queue. For example, the gatekeeper command component 418-1 of the gatekeeper application 418 may queue the received telemetry storage request into a gatekeeper command queue. The gatekeeper command queue may be configured to queue the received telemetry storage request for processing by the gatekeeper worker component 418-2 independently and/or asynchronously with respect to the processing of any queued telemetry storage request by the gatekeeper command component 418-1 as further discussed with respect to FIG. 6.

At stage 506, the method 500 may determine whether the telemetry storage request was properly queued in the gatekeeper command queue. For example, the gatekeeper command component 418-1 of the gatekeeper application 418 may determine whether the telemetry storage request was properly queued in the gatekeeper command queue. When the gatekeeper command component 418-1 of the gatekeeper application 418 determines that the telemetry storage request was properly queued in the gatekeeper command queue, the gatekeeper command component 418-1 may proceed to stage 508. Otherwise, when the gatekeeper command component 418-1 of the gatekeeper application 418 determines that the telemetry storage request was not properly queued in the gatekeeper command queue, the gatekeeper command component 418-1 may proceed to stage 510.

At stage 508, the method 500 may transmit a telemetry storage success response to the telemetry application indicating that the telemetry storage request has been properly received and queued. For example, the gatekeeper command component 418-1 of the gatekeeper application 418 may transmit the telemetry storage success response to the telemetry storage application 240, when the gatekeeper command component 418-1 determines that the received telemetry storage request was properly queued in the gatekeeper command queue. The telemetry storage success response may indicate that the telemetry storage request has been properly received by the gatekeeper command component 418-1 and queued in the gatekeeper command queue.

At stage 510, the method 500 may proceed by transmitting a telemetry storage failure response to the telemetry application, telemetry storage failure response indicating that the telemetry storage request has not been queued. For example, the gatekeeper command component 418-1 of the gatekeeper application 418 may transmit the telemetry storage failure response to the telemetry storage application 240, when the gatekeeper command component 418-1 determines that the received telemetry storage request was not queued in the gatekeeper command queue. The telemetry storage failure response may indicate that the telemetry storage request was not properly received by the gatekeeper command component 418-1 or otherwise properly queued in the gatekeeper command queue.

It may be appreciated that after the gatekeeper application 418 (e.g., gatekeeper command component 418-1 of the gatekeeper application 418) transmits either a telemetry storage success response or a telemetry storage failure response, the gatekeeper command component 418-1 may readily receive another telemetry storage request such as, for example, another telemetry storage request transmitted by a telemetry application (e.g., telemetry application 240, etc.) associated with one or more tenants and perform method 500 starting at stage 502.

Figure 6:
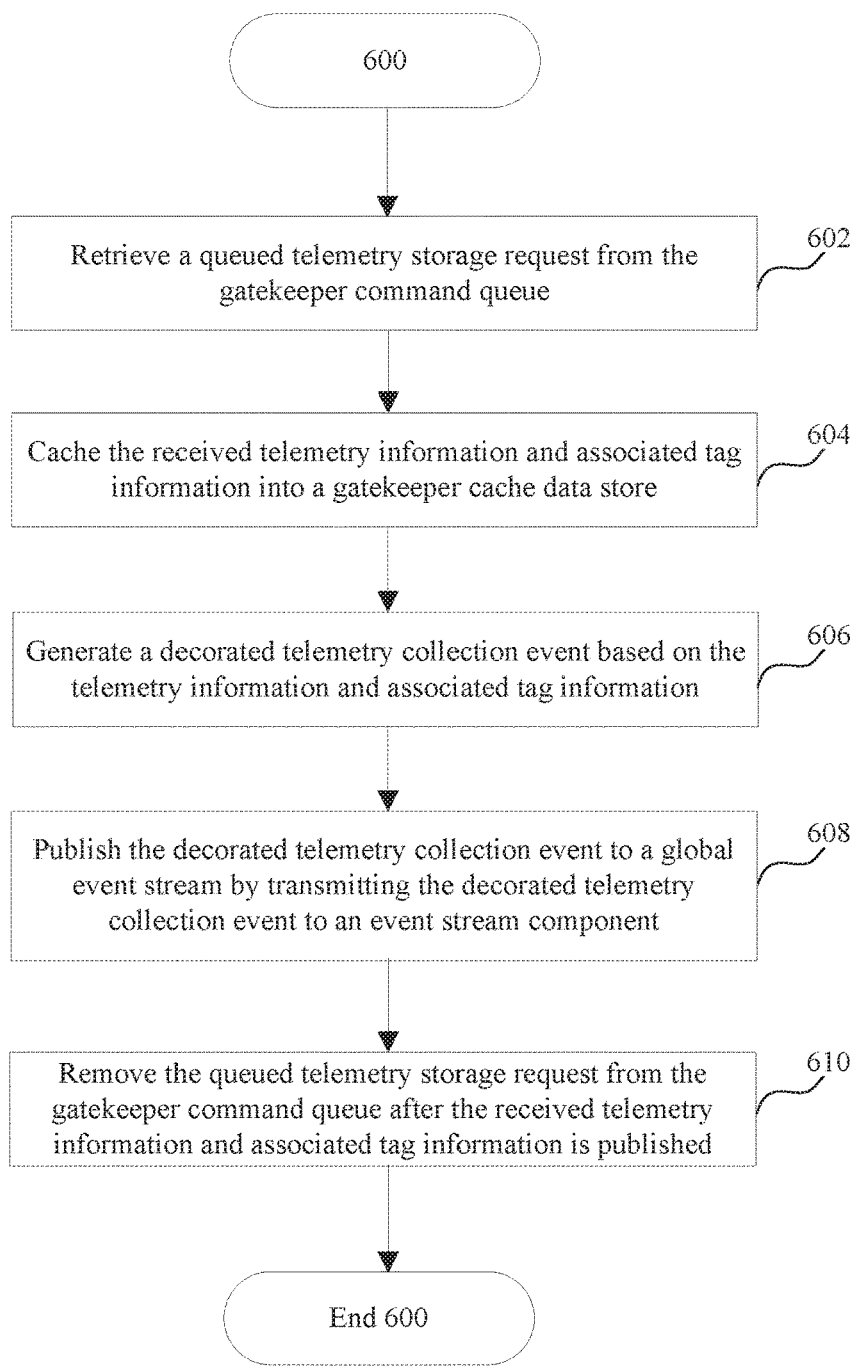
FIG. 6 illustrates another example method for rapid and asynchronous multitenant telemetry collection and storage in an example embodiment.

FIG. 6 illustrates another example method 600 rapid asynchronous multitenant telemetry collection and storage, according to an embodiment. The example method 600 may be performed or otherwise implemented by the gatekeeper application 418 (e.g., gatekeeper worker component 418-2), which may be a software application such as, for example a container application or native application, as discussed with respect to FIGS. 1 and 2. It is to be appreciated that not all stages may be needed to perform the disclosure provided herein. Further, some of the stages may be performed simultaneously, or in a different order than shown in FIG. 6, as will be understood by a person of ordinary skill in the art. In some embodiments, method 600 may be performed by AADDOMA 162 of FIG. 1 and/or the gatekeeper application 418 of FIG. 4.

At stage 602, the method 600 may retrieve a queued telemetry storage request from the gatekeeper command queue, where the telemetry storage request may include a telemetry collection event. For example, the gatekeeper worker component 418-2 of the gatekeeper application 418 may be configured to retrieve a queued telemetry storage request from the gatekeeper command queue and begin processing the queued telemetry storage request independently and/or asynchronously with respect to any incoming telemetry storage requests that the gatekeeper command component 418-1 may be receiving. The telemetry storage request may include, without limitation, a telemetry collection event and the telemetry collection event may include, without limitation, telemetry information collected by telemetry application 240 and received in the telemetry storage request and associated telemetry tag information generated by the telemetry application 240 also received in the telemetry storage request.

At stage 604, the method 600 may cache the received telemetry collection event including the telemetry information and associated telemetry tag information into a gatekeeper cache data store. For example, the gatekeeper worker component 418-2 of the gatekeeper application 418 may cache the received telemetry collection event including the telemetry information collected by a telemetry application 240 and associated telemetry tag information generated by the telemetry application 240 in a gatekeeper cache data store 420.

At stage 606, the method 600 may generate a decorated telemetry collection event based on the telemetry information and associated tag information. For example, the gatekeeper worker component 418-2 of the gatekeeper application 418 may generate a decorated telemetry collection event based on the telemetry information and associated telemetry tag information telemetry information received in a telemetry storage request. The decorated telemetry information may generally assist in the identification of ownership of telemetry information (e.g., logs information, metrics information, etc.) received from one or more telemetry applications (e.g., telemetry application 240).

At stage 608, the method 600 may publish the decorated telemetry collection event to a global event stream by transmitting the decorated telemetry collection event to an event stream component. For example, the gatekeeper worker component 418-2 of the gatekeeper application 418 may publish the decorated telemetry collection event to a global event stream by transmitting the decorated telemetry collection event to an event stream component 310-3, where one or more components of the AADOMA 162 (e.g., long-term telemetry storage component 310-5, telemetry collection storage component 310-1) may receive, process, and/or store the decorated telemetry collection event.

At stage 610, the method 600 may remove the queued telemetry storage request from the gatekeeper command queue after the decorated telemetry collection event is published. For example, after the decorated telemetry collection event has been successfully published to the global event stream 412, the gatekeeper worker component 418-2 of the gatekeeper application 418 may remove the queued telemetry storage request that was retrieved at stage 602 from the gatekeeper command queue.

It may be appreciated that after the gatekeeper command component 418-2 removes the queued telemetry storage request, the gatekeeper worker component 418-2 may retrieve another telemetry storage request queued in the gatekeeper command queue perform method 600 starting at stage 602. Additionally, the method 600 may be performed asynchronously and/or independently of method 500 as previously discussed with respect to FIG. 5. Additionally, the telemetry collection and storage component 310-1 and the long-term telemetry storage component 310-5 may be configured to process the telemetry collection events published to the global event stream 412 as previously discussed.

Example Computer System

Various embodiments and components therein can be implemented, for example, using one or more well-known computer systems, such as, for example, platform server devices 164, development devices 104, consumer devices 108, server devices 122, and server devices 124 of FIG. 1. Computer system 700 can be any well-known computer capable of performing the functions described herein.

Computer system 700 includes one or more processors (also called central processing units, or CPUs), such as a processor 704. Processor 704 is connected to a communication infrastructure or bus 706.

One or more processors 704 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 also includes user input/output device(s) 703, such as monitors, keyboards, pointing devices, etc., that communicate with communication infrastructure 706 through user input/output interface(s) 702.

Computer system 700 also includes a main or primary memory 708, such as random access memory (RAM). Main memory 708 may include one or more levels of cache. Main memory 708 has stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to an exemplary embodiment, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communications path 726.

In an embodiment, a tangible apparatus or article of manufacture comprising a tangible computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Figure 7:
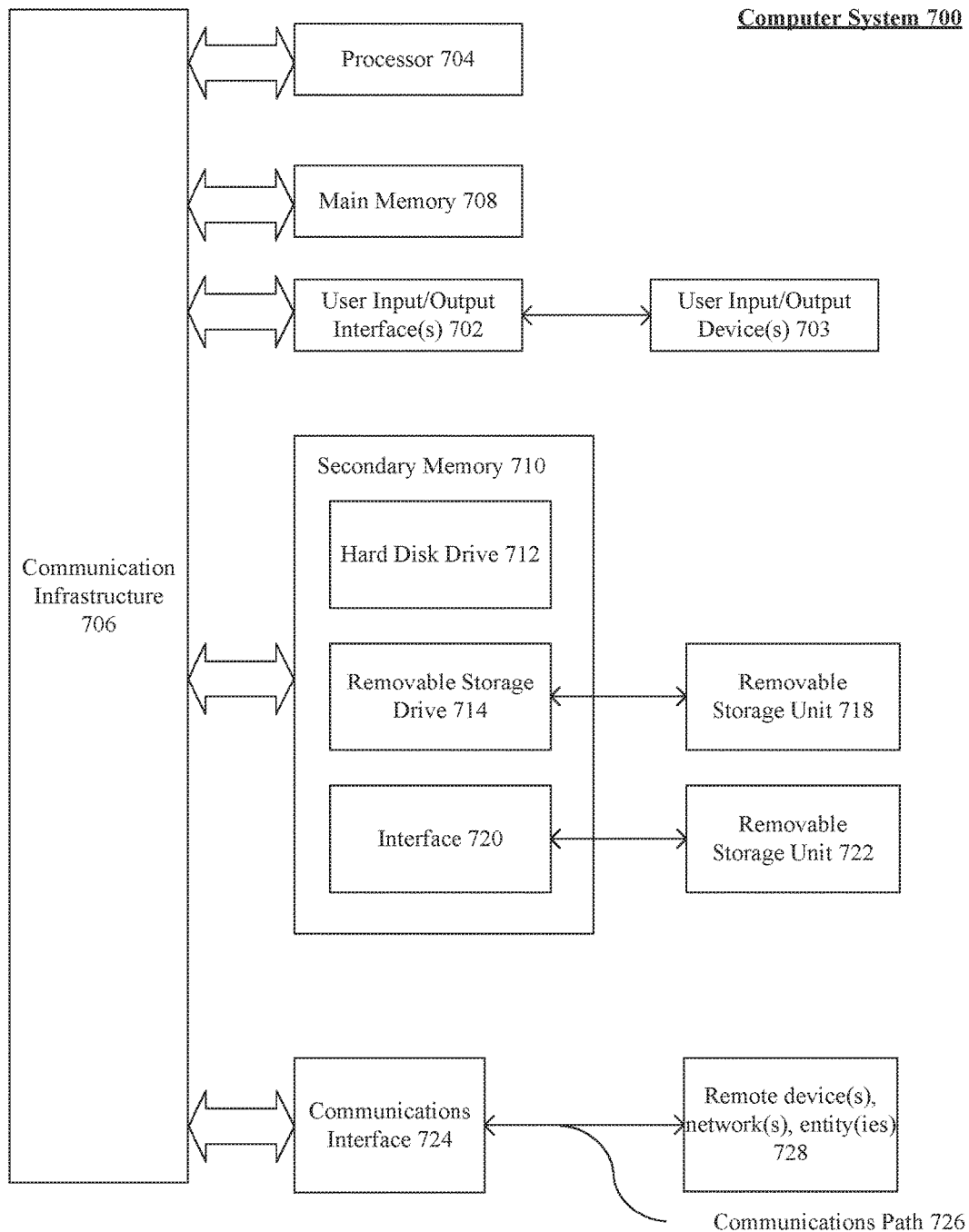
FIG. 7 illustrates an example computer system useful for implementing various embodiments.

Based on the teachings contained in this disclosure, it will be apparent to persons skilled in the relevant art(s) how to make and use embodiments of the disclosure using data processing devices, computer systems and/or computer architectures other than that shown in FIG. 7. In particular, embodiments may operate with software, hardware, and/or operating system implementations other than those described herein.

CONCLUSION

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventors, and thus, are not intended to limit the disclosure or the appended claims in any way.

While the invention has been described herein with reference to exemplary embodiments for exemplary fields and applications, it should be understood that the invention is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

The breadth and scope of the disclosure should not be limited by any of the above-described exemplary embodiments, but should be defined only in accordance with the following claims and their equivalents.

What is claimed is:

1. A system for collection and storage of telemetry data, comprising:
   at least one processor; and
   a memory operatively coupled to the at least one processor, the at least one processor configured at least in part to:
      receive, by a gatekeeper command component, a telemetry storage request from a telemetry application configured to collect telemetry information from a deployed application, wherein the telemetry storage request comprises telemetry information and associated telemetry tag information;
      queue, by the gatekeeper command component, the received telemetry storage request into a gatekeeper command queue, wherein the gatekeeper command queue is configured to store the telemetry storage request;
      retrieve, by a gatekeeper worker component, the received telemetry storage request from the gatekeeper command queue;
      generate, by the gatekeeper worker component, a decorated telemetry collection event based on the telemetry information and the associated telemetry tag information;
      publish, by the gatekeeper worker component, the decorated telemetry collection event to an event stream by transmitting the decorated telemetry collection event to an event stream component configured to manage the event stream, wherein the event stream is utilized by a notification-and-telemetry processing component to train one or more machine learning algorithms to predict an occurrence of one or more breach conditions;
      transmit, by the gatekeeper command component, a telemetry storage success response to the telemetry application indicating that the telemetry storage request has been properly received and queued;
      cache, by the gatekeeper worker component, the telemetry information and the associated telemetry tag information into a gatekeeper cache data store; and
      remove, by the gatekeeper worker component, the queued telemetry storage request from the gatekeeper command queue after the decorated telemetry collection event is published by the event stream component.

2. The system of claim 1, wherein the at least one processor is further configured to:
   transmit a telemetry storage failure response to the telemetry application, the telemetry storage failure response indicating that the telemetry storage request has not been queued, wherein the telemetry application is configured to cache the telemetry storage request for re-transmission at a different time period, in response to receiving the telemetry storage failure response.

3. The system of claim 1, wherein the telemetry application comprises:
   a logging component configured to collect logs information generated by the deployed application that is associated with an application developer, and
   a metrics component configured to collect metrics information generated by the deployed application that is associated with the application developer.

4. The system of claim 3, wherein the at least one processor is further configured to:
   retrieve, by a telemetry collection and storage component, the decorated telemetry collection event from a global event stream;
   store, by the telemetry collection and storage component, the logs information and associated telemetry tag information to a logs data store, wherein the logs data store is a multitenant searchable data store; and
   store, by the telemetry collection and storage component, the metrics information and associated telemetry tag information to a metrics data store configured to store time series information.

5. The system of claim 1, wherein:
   the gatekeeper cache data store is configured to store the telemetry information and the associated telemetry tag information received from the telemetry application with high availability and redundancy; and
   the at least one processor is configured to store, by a long-term telemetry storage component, the telemetry information and associated telemetry tag information of the decorated telemetry collection event to a long-term telemetry data store, after the decorated telemetry collection event has persisted in a global event stream for a specific time period.

6. The system of claim 1, wherein:
   the telemetry application is associated with at least one tenant of at least one deployed application of at least one cluster node in a cluster,
   the decorated telemetry collection event includes the telemetry information, the associated telemetry tag information, and decorated telemetry tag information generated based on the telemetry information and the associated telemetry tag information, and
   the generated decorated telemetry tag information includes a tenant identifier, wherein the tenant identifier identifies the at least one tenant associated with the at least one deployed application.

7. A computer-implemented method for collection and storage of telemetry data, comprising:
   receiving a telemetry storage request from a telemetry application configured to collect telemetry information from a deployed application, wherein the telemetry storage request comprises telemetry information and associated telemetry tag information;
   queuing the received telemetry storage request into a gatekeeper command queue, wherein the gatekeeper command queue is configured to store the received telemetry storage request;
   retrieving the received telemetry storage request from the gatekeeper command queue;
   generating a decorated telemetry collection event based on the telemetry information and the associated telemetry tag information;
   publishing the decorated telemetry collection event to an event stream by transmitting the decorated telemetry collection event to an event stream component configured to manage the event stream, wherein the event stream is utilized by a notification-and-telemetry processing component to train one or more machine learning algorithms to Dredict an occurrence of one or more breach conditions;
   transmitting a telemetry storage success response to the telemetry application indicating that the telemetry storage request has been properly received and queued;
   caching the telemetry information and the associated telemetry tag information into a gatekeeper cache data store; and remove, by the gatekeeper worker component, the queued telemetry storage request from the gatekeeper command queue after the decorated telemetry collection event is published by the event stream component.

8. The method of claim 7, further comprising:
transmitting a telemetry storage failure response to the telemetry application, the telemetry storage failure response indicating that the telemetry storage request has not been queued, wherein the telemetry application caches the telemetry storage request for retransmission at a different time period, in response to receiving the telemetry storage failure response.

9. The method of claim 7, wherein the telemetry application comprises:
a logging component configured to collect logs information generated by the deployed application that is associated with an application developer, and
a metrics component configured to collect metrics information generated by the deployed application that is associated with the application developer.

10. The method of claim 9, wherein:
the decorated telemetry collection event is retrieved by a telemetry collection and storage component from a global event stream;
the logs information and the associated telemetry tag information are stored by the telemetry collection and storage component in a logs data store configured as a multitenant searchable data store; and
the metrics information and associated telemetry tag information are stored by the telemetry collection and storage component in a metrics data store configured to store time series information.

11. The method of claim 9, wherein:
the gatekeeper cache data store is configured to store the telemetry information and associated telemetry tag information received from the telemetry application with high availability and redundancy, and
the telemetry information and associated telemetry tag information of the decorated telemetry collection event are stored in a long-term telemetry data store by a long-term telemetry storage component, after the decorated telemetry collection event has persisted in a global event stream for a specific time period.

12. The method of claim 7, wherein:
the telemetry application is associated with at least one tenant of at least one deployed application of at least one cluster node in a cluster, the decorated telemetry collection event includes the telemetry information, the associated telemetry tag information, and decorated telemetry tag information generated based on the telemetry information and the associated telemetry tag information, and the generated decorated telemetry tag information includes a tenant identifier, wherein the tenant identifier identifies the at least one tenant associated with the at least one deployed application.

13. A non-transitory computer-readable storage device having instructions stored thereon that, when executed by at least one processor, cause the at least one processor to perform operations for collection and storage of telemetry data, the operations comprising:
receiving a telemetry storage request from a telemetry application configured to collect telemetry information from a deployed application, wherein the telemetry storage request comprises telemetry information and associated telemetry tag information;
queuing the received telemetry storage request into a gatekeeper command queue, wherein the gatekeeper command queue is configured to store the received telemetry storage request;
retrieving the received telemetry storage request from the gatekeeper command queue;
generating a decorated telemetry collection event based on the telemetry information and the associated telemetry tag information;
publishing the decorated telemetry collection event to an event stream by transmitting the decorated telemetry collection event to an event stream component configured to manage the event stream, wherein the event stream is utilized by a notification-and-telemetry processing component to train one or more machine learning algorithms to predict an occurrence of one or more breach conditions;
transmitting, a telemetry storage success response to the telemetry application indicating that the telemetry storage request has been properly received and queued; and
caching the telemetry information and the associated telemetry tag information into a gatekeeper cache data store; and
removing, by the gatekeeper worker component, the queued telemetry storage request from the gatekeeper command queue after the decorated telemetry collection event is published by the event stream component.

14. The non-transitory computer-readable storage device of claim 13, the operations further comprising:
transmitting a telemetry storage failure response to the telemetry application, the telemetry storage failure response indicating that the telemetry storage request has not been queued, wherein the telemetry application caches the telemetry storage request for retransmission at a different time period, in response to receiving the telemetry storage failure response.

15. The non-transitory computer-readable storage device of claim 13, wherein:
the decorated telemetry collection event is retrieved by a telemetry collection and storage component from a global event stream;
the telemetry information includes logs information and metrics information;
the logs information and the associated telemetry tag information are stored by the telemetry collection and storage component in a logs data store configured as a multitenant searchable data store; and
the metrics information and associated telemetry tag information are stored by the telemetry collection and storage component in a metrics data store configured to store time series information.

16. The non-transitory computer-readable storage device of claim 13, wherein:
the gatekeeper cache data store is configured to store the telemetry information and the associated telemetry tag information received from the telemetry application with high availability and redundancy, and
the telemetry information and associated telemetry tag information of the decorated telemetry collection event are stored in a long-term telemetry data store by a long-term telemetry storage component, after the decorated telemetry collection event has persisted in a global event stream for a specific time period.

17. The non-transitory computer-readable storage device of claim 13, wherein:
the telemetry application is associated with at least one tenant of at least one deployed application of at least one cluster node in a cluster, the decorated telemetry collection event includes telemetry information, the associated telemetry tag information, and decorated telemetry tag information generated based on the telemetry information and the associated telemetry tag information, and the generated decorated telemetry tag information includes a tenant identifier, and the tenant identifier identifies the at least one tenant associated with the at least one deployed application.

* * * * *